United States Patent [19]

Hmelovsky

[11] 4,300,661
[45] Nov. 17, 1981

[54] ELEVATOR DOOR STALL MODE WITH HYSTERESIS

[75] Inventor: Michael W. Hmelovsky, Warehouse Point, Conn.

[73] Assignee: Otis Elevator Company, Hartford, Conn.

[21] Appl. No.: 107,674

[22] Filed: Dec. 27, 1979

[51] Int. Cl.³ .............................................. B66B 13/08
[52] U.S. Cl. ..................................... 187/29 R; 187/31
[58] Field of Search ................................... 187/29–31, 187/51, 52; 318/256, 264, 266, 280, 283

[56] References Cited

U.S. PATENT DOCUMENTS

| | | | |
|---|---|---|---|
| 2,363,929 | 11/1944 | Banks et al. | 187/52 X |
| 3,376,486 | 4/1968 | Caputo | 187/31 X |
| 4,006,392 | 2/1977 | Catlett et al. | 318/266 |
| 4,193,478 | 3/1980 | Keller et al. | 187/29 |

Primary Examiner—R. L. Moses
Assistant Examiner—W. E. Duncanson, Jr.
Attorney, Agent, or Firm—Robert E. Greenstien

[57] ABSTRACT

An elevator system includes a microprocessor-based cab controller which controls door motion and which controls the generation of stall forces in the door. The disclosed embodiment includes a dictated velocity, high-speed door profile, and a position-controlled dictated velocity profile, door motion being controlled as the difference between actual door velocity and dictated velocity. A stall mode, in which the door motor is provided with currents required to provide a desired force on the door, is invoked with the door velocity is less than a predetermined stall velocity, provided that the door is at an extreme position of traverse, the previous cycle was a stall cycle, or a hysteresis time period has elapsed with the velocity consistently less than the stall velocity. An exemplary elevator control system and microprocessor-based cab controller, as well as an exemplary overall door control program and details of the present invention are disclosed.

3 Claims, 20 Drawing Figures

FIG. 4 TIME CONTROLLED OPENING PROFILE

POSITION CONTROLLED OPENING PROFILE

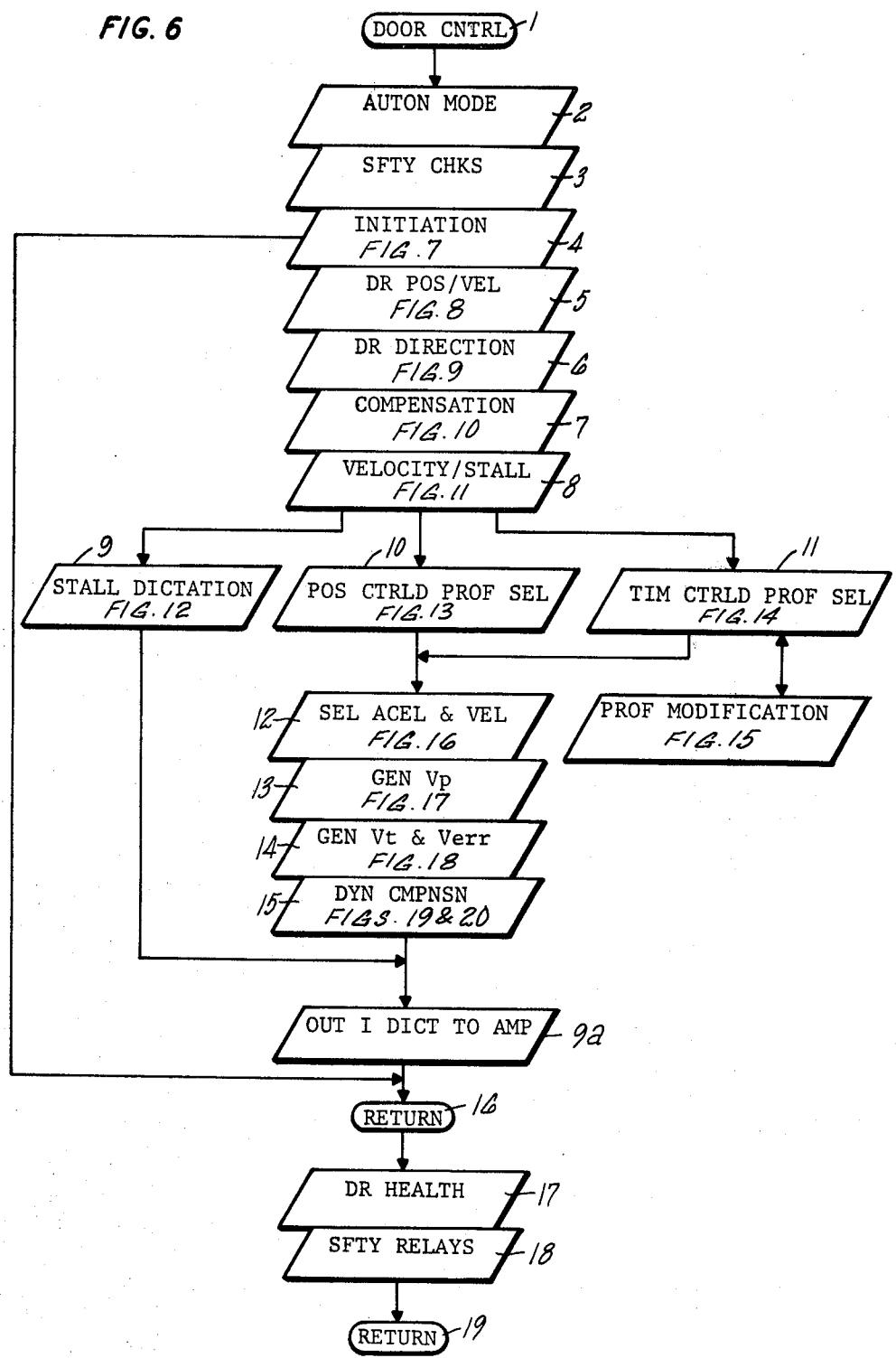

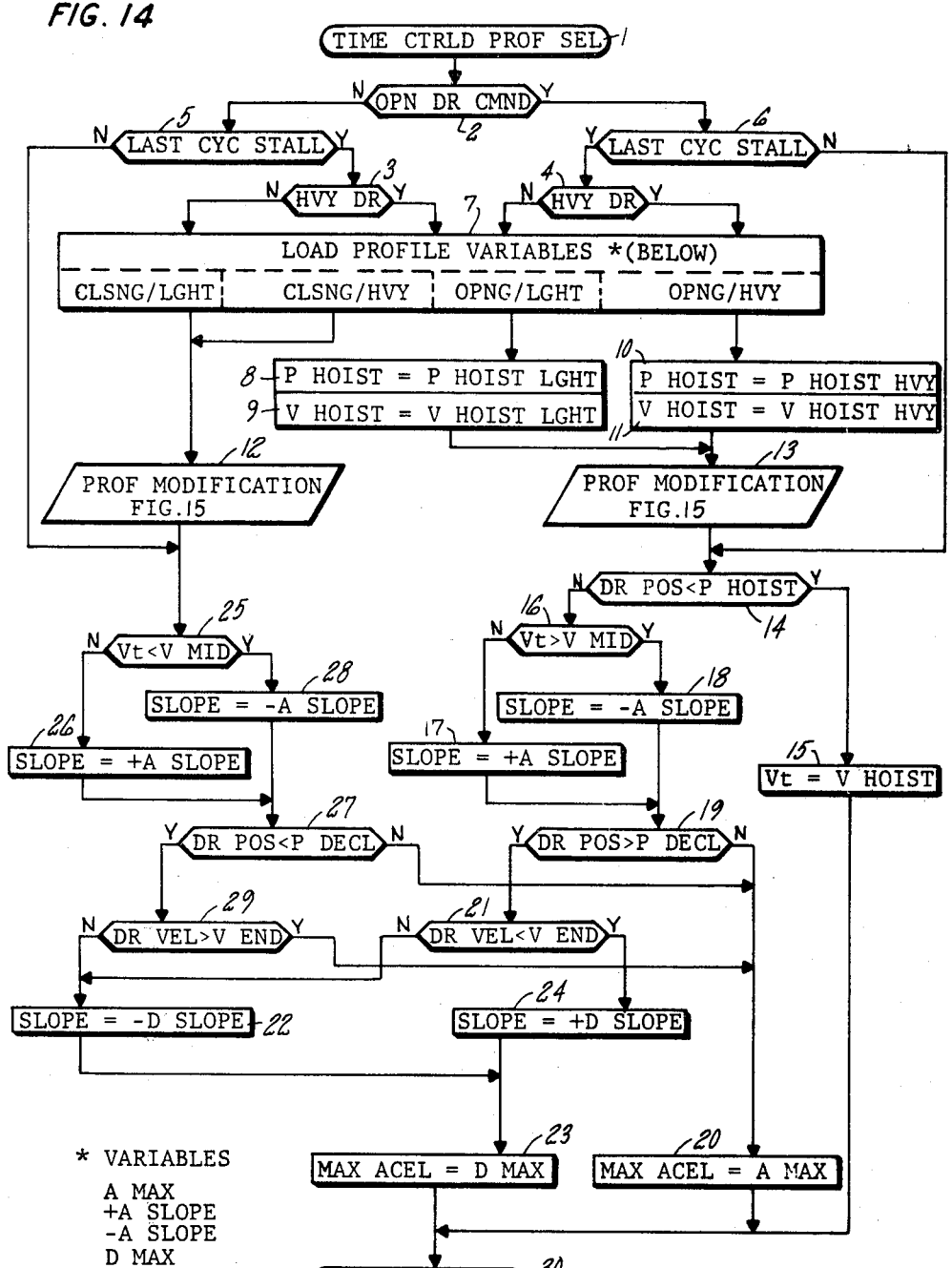

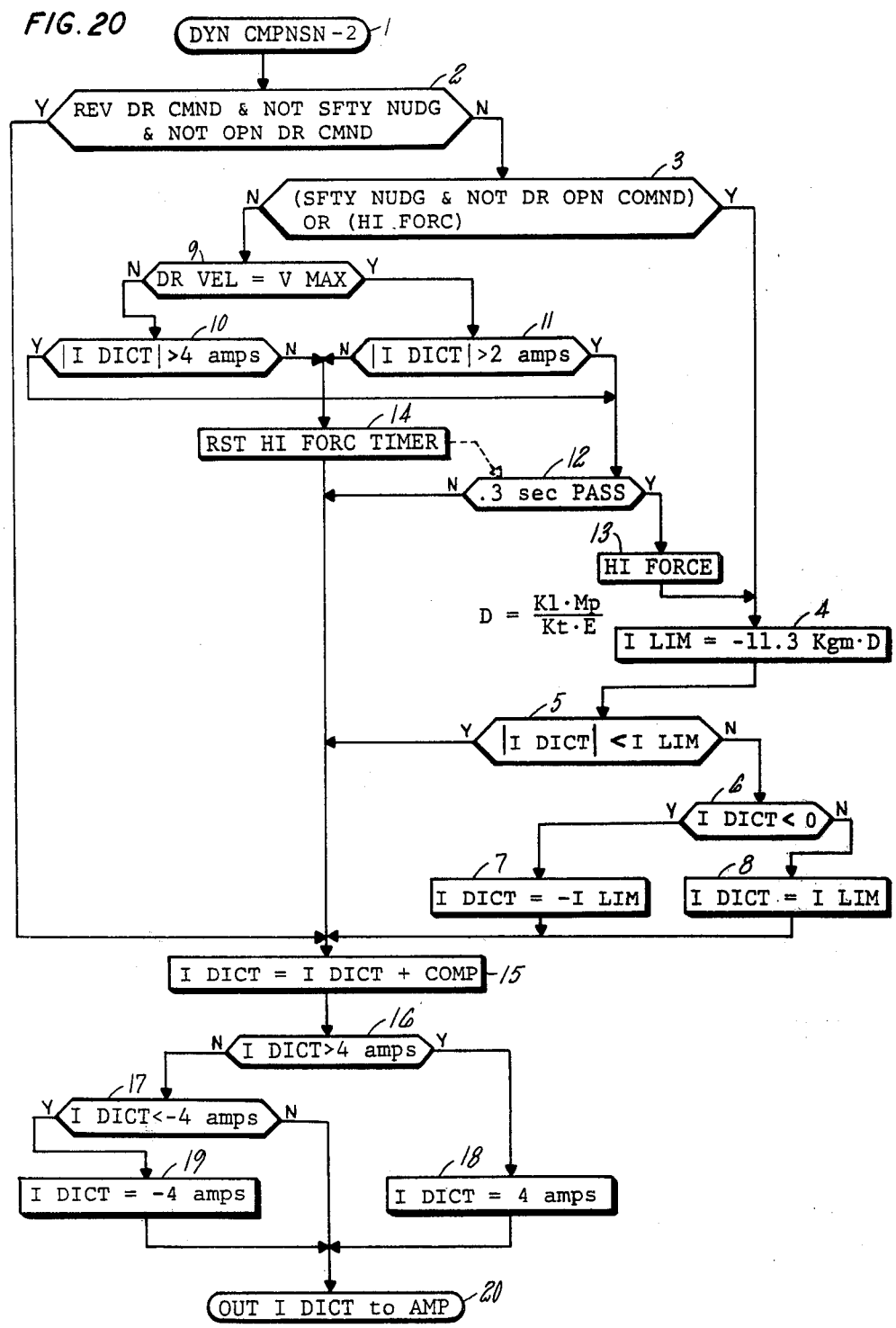

ELEVATOR DOOR STALL MODE WITH HYSTERESIS

DESCRIPTION

Technical Field

This invention relates to elevators, and more particularly to improvements in elevator door controls.

Background Art

Typical elevators known to the art utilize analog systems for controlling elevator door motion, such systems being characterized by controlling the voltage applied to the elevator door motor as a function of the position of the door, which in turn is controlled either by cam switches, switches positioned along the path of the door travel, or potentiometers responsive to door position.

In such systems, the inherent time constants in the analog circuits, the necessary time for relays to operate, and the mechanical inertia of the door system as a whole provide inherent lags that necessarily permitted discrete functions, such as switches indicative of doors being fully open or being fully closed, to be smoothed out in terms of system response thereto. And, step function voltage changes are similarly responded to in a lag fashion, which avoids excessive jerky response, overshooting situations, and the like.

The difficulty with most door control systems known to the prior art is that they are subject to all the frailties of mechanical systems, such as wear and misalignment. The maintenance of such systems is difficult and expensive. Frequent adjustment may be required in order to derive proper operation of the door. Diagnosis of any faulty operation of the door is difficult in such systems. And, such systems are not well suited to providing various optimum characteristics to suit a variety of constraints imposed upon the door under all circumstances.

More modern door systems may employ more sophisticated door controls, in which the door behavior is precisely dictated in accordance with desired response, examples of which are described in detail with respect to related inventions, hereinafter. However, the most sophisticated of such systems may operate in response to discrete states and discrete values, such as digital representations of speed, motor current, and the like. Then, the imperfections in some of the accessory apparatus to elevator doors become important. For instance, contact bounce on switches indicative of door position can cause the discrete states of the door motion controller to oscillate back and forth in response to the indicated condition of the switch. Noise and digital granularity can cause velocity signals to oscillate about a comparison value, and thereby cause unstable response thereto. This can result in erratic behavior of the door controller, and/or impermissible, faulty door operation.

Disclosure of Invention

Objects of the invention include improvements in elevator door motion controller operating states.

According to the present invention, an elevator door motion controller is operative in a motion mode and a stall mode. When in the motion mode, command signals are sent to the motor of the door operating mechanism to effect door motion in a desired fashion. When in the stall mode, command signals are sent to the motor of the door operating mechanism to create a desired force on the door. In accordance with the invention, the elevator door controller operates in the motion mode whenever the velocity of the door is greater than a predetermined stall velocity. When the elevator velocity is less than the predetermined stall velocity, the controller may operate in the stall mode if the velocity has been below the stall velocity for a predetermined hysteresis period of time, or if the previous cycle was in the stall mode, of if the door is indicated as being fully open or fully closed, in dependence upon the direction of the motion involved.

The present invention provides hysteresis to the transfer from a motion mode of door control to a stall mode of door control, thereby obviating oscillation between two modes, particularly as might result from contact bounce with respect to switches indicative of fully opened and fully closed positions of the door. The invention is well suited for utilization in modern elevator door controllers which may employ signal processes of a sophisticated type, such as digital circuits or microprocessors, to control door motion. The invention may be readily implemented utilizing apparatus and techniques which are well within the skill of the art in the light of the following and specific teachings of the invention, as described more fully hereinafter.

The foregoing and other objects, features and advantages of the present invention will become more apparent in the light of the following detailed description of an exemplary embodiment thereof, as illustrated in the accompanying drawings.

BRIEF DESCRIPTION OF DRAWINGS

FIG. 6 is a logic flow diagram of the subroutines of a door control routine and door health and safety subroutines, which may be utilized in implementing the present invention and/or its environment;

FIG. 14 is a logic flowchart of a time-controlled profile select subroutine;

FIGS. 19 and 20 are logic flowcharts of a dynamic compensation subroutine.

BEST MODE FOR CARRYING OUT THE INVENTION

Figure 1:
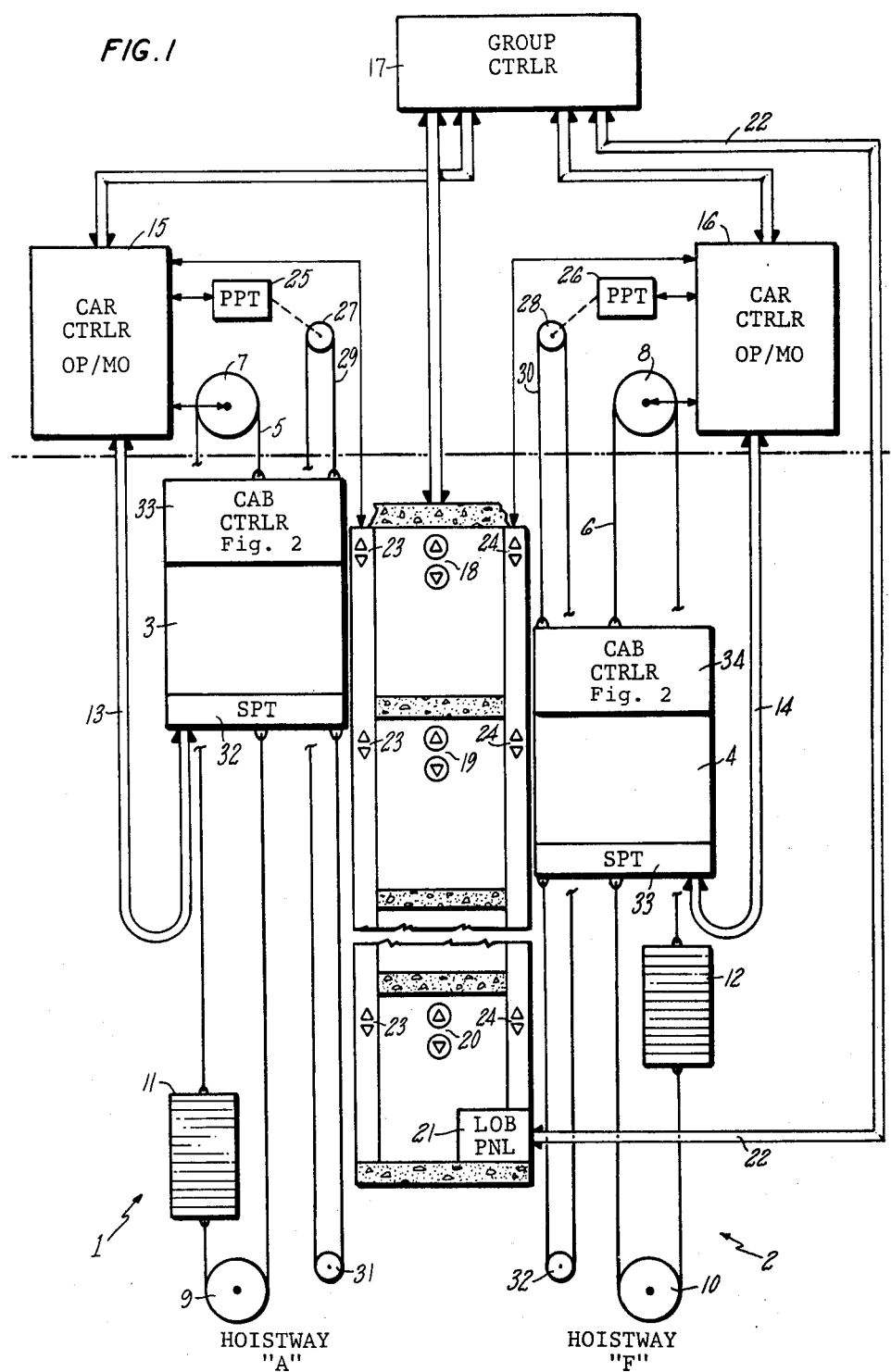
FIG. 1 is a simplified, schematicized view of an elevator system in which the present invention may be practiced.

A simplified description of a multi-car elevator system, of the type in which the present invention may be practiced, is illustrated in FIG. 1. Therein, a plurality of hoistways, HOISTWAY "A" 1 and HOISTWAY "F" 2 are illustrated, the remainder are not shown for simplicity. In each hoistway, an elevator cab or cab 3, 4 is guided for vertical movement on rails (not shown). Each car is suspended on a rope 5, 6 which usually comprises a plurality of steel cables, that is driven either direction or held in a fixed position by a drive sheave/motor/brake assembly 7, 8, and guided by an idler or return sheave 9, 10 in the well of the hoistway. The rope 5, 6 normally also carries a counterweight 11, 12 which is typically equal to approximately the weight of the cab when it is carrying half of its permissable load.

Each cab 3, 4 is connected by a traveling cable 13, 14 to a corresponding car controller 15, 16 which is located in a machine room at the head of the hoistways. The car controllers 15, 16 provide operation and motion control to the cabs, as is known in the art. In the case of multi-car elevator systems, it has long been common to provide a group controller 17 which receives up and down hall calls registered on hall call buttons 18–20 on the floors of the buildings, allocates those calls to the various cars for response, and distributes cars among the floors of the building, in accordance with any one of several various modes of group operation. Modes of group operation may be controlled in part by a lobby panel 21 which is normally connected by suitable building wiring 22 to the group controller in multi-car elevator systems.

The car controllers 15, 16 also control certain hoistway functions which relate to the corresponding car, such as the lighting of up and down response lanterns 23, 24, there being one such set of lanterns 23 assigned to each car 3, and similar sets of lanterns 24 for each other car 4, designating the hoistway door where service in response to a hall call will be provided for the respective up and down directions.

The foregoing is a description of an elevator system in general, and, as far as the description goes thus far, is equally descriptive of elevator systems known to the prior art, and elevator systems incorporating the teachings of the present invention.

Although not required in the practice of the present invention, the elevator system in which the invention is utilized may derive the position of the car within the hoistway by means of a primary position transducer (PPT) 25, 26 which may comprise a quasi-absolute, incremental encoder and counting and directional interface circuitry of the type described in a commonly owned copending U.S. patent application of Marvin Masel et al, Ser. No. 927,242, filed on July 21, 1978, (a continuation of Ser. No. 641,798, filed Dec. 18, 1975), entitled HIGH RESOLUTION AND WIDE RANGE SHAFT POSITION TRANSDUCER SYSTEMS. Such transducer is driven by a suitable sprocket 27, 28 in response to a steel tape 29, 30 which is connected at both its ends to the cab and passes over an idler sprocket 31, 32 in the hoistway well. Similarly, although not required in an elevator system to practice the present invention, detailed positional information at each floor, for more door control and for verification of floor position information derived by the PPT 25, 26, may employ a secondary position transducer (SPT) 32, 33 of the type disclosed and claimed in a commonly owned copending U.S. Pat. application filed on Nov. 13, 1979 by Fairbrother, Ser. No. 093,475. Or, if desired, the elevator system in which the present invention is practiced may employ inner door zone and outer door zone hoistway switches of the type known in the art.

The foregoing description of FIG. 1 is intended to be very general in nature, and to encompass, although not shown, other system aspects such as shaftway safety switches and the like, which have not been shown herein for simplicity, since they are known in the art and not a part of the invention herein.

All of the functions of the cab itself are directed, or communicated with, by means of a cab controller 33, 34 in accordance with the present invention, and may provide serial, time-multiplied communications with the car controller as well as direct, hard-wired communications with the car controller by means of the traveling cables 13, 14. The cab controller, for instance, will monitor the car call buttons, door open and door close buttons, and other buttons and switches within the car; it will control the lighting of buttons to indicate car calls, and will provide control over the floor indicator inside the car which designates the approaching floor. The cab controller interfaces with load weighing transducers to provide weight information used in controlling the motion, operation, and door functions of the car. The load weighing may be in accordance with the invention described and claimed in commonly owned copending patent applications filed on Nov. 28, 1979 by Donofrio, Ser. No. 098,004 and by Games, Ser. No. 098,003. A most significant job of the cab controller 33, 34 is to control the opening and closing of the door, in accordance with demands therefore under conditions which are determined to be safe.

The makeup of microcomputer systems, such as may be used in the implementation of the car controllers 15, 16, a group controller 17, and the cab controllers 33, 34, can be selected readily available components or families thereof, in accordance with known technology as described in various commercial and technical publications. These include "An Introduction to Microcomputers, Volume II, Some Real Products" published in 1977 by Adam Osborne and Associates, Inc., Berkeley, California, U.S.A., and available from Sydex, Paris, France; Arrow International, Tokyo, Japan, L. A. Varah Ltd., Vancouver, Canada, and Taiwan Foreign Language Book Publishers Council, Taipei, Taiwan. And, "Digital Microcomputer Handbook", 1977-1978 Second Edition, published by Digital Equipment Corporation, Maynard, Massachusetts, U.S.A. And, Simpson, W. D., Luecke, G., Cannon, D. L., and Clemens, D. H., "9900 Family Systems Design and Data Book", 1978, published by Texas Instruments, Inc., Houston, Texas, U.S.A. (U.S. Library of Congress Catalog No. 78-058005). Similarly, the manner of structuring the software for operation of such computers may take a variety of known forms, employing known principles which are set forth in a variety of publications. One basic fundamental treatise is "The Art of Computer Programming", in seven volumes, by the Addison-Wesley Publishing Company, Inc., Reading, Massachusetts, and Menlo Park, California, U.S.A.; London, England; and Don Mills, Ontario, Canada (U.S. Library of Congress Catalog No. 67-26020). A more popular topical publication is "EDN Microprocessor Design Series" published in 1975 by Kahners Publishing Company (Electronic Division News), Boston, Massachusetts, U.S.A. And a useful work is Peatman, J. B., "Microcomputer-Based Design" published in 1977 by McGraw Hill Book Company (worldwide), U.S. Library of Congress Catalog No. 76-29345.

The software structures for implementing the present invention, and peripheral features which may be disclosed herein, may be organized in a wide variety of fashions. However, utilizing the Texas Instruments 9900 family, and suitable interface modules for working therewith, an elevator control system of the type illustrated in FIG. 1, with separate controllers for the cabs, the cars, and the group, has been implemented utilizing real time interrupts, power on causing a highest priority interrupt which provides system initialization (above and beyond initiation which may be required in any given function of one of the controllers). And, it has employed an executive program which responds to real time interrupts to perform internal program functions and which responds to communication-initiated interrupts from other controllers in order to process serial communications with the other controllers, through the control register unit function of the processor. The various routines are called in timed, interleaved fashion, some routines being called more frequently than others, in dependence upon the criticality or need for updating the function performed thereby. Specifically, there is no function relating to elevatoring which is not disclosed herein that is not known and easily implemented by those skilled in the elevator art in the light of the teachings herein, nor is there any processor function not disclosed herein which is incapable of implementations using techniques known to those skilled in the processing arts, in the light of the teachings herein.

The invention herein is not concerned with the character of any digital processing equipment, nor is it concerned with the programming of such processor equipment; the invention is disclosed in terms of an implementation which combines the hardware of an elevator system with suitably-programmed processors to perform elevator functions, which have never before been performed. The invention is not related to performing the microprocessors that which may have in the past been performed with traditional relay/switch circuitry nor with hard wired digital modules; the invention concerns new elevator functions, and the disclosure herein is simply illustrative of the best mode contemplated for carrying out the invention, but the invention may also be carried out with other combinations of hardware and software, or by hardware alone, if desired in any given implementation thereof.

Figure 2:
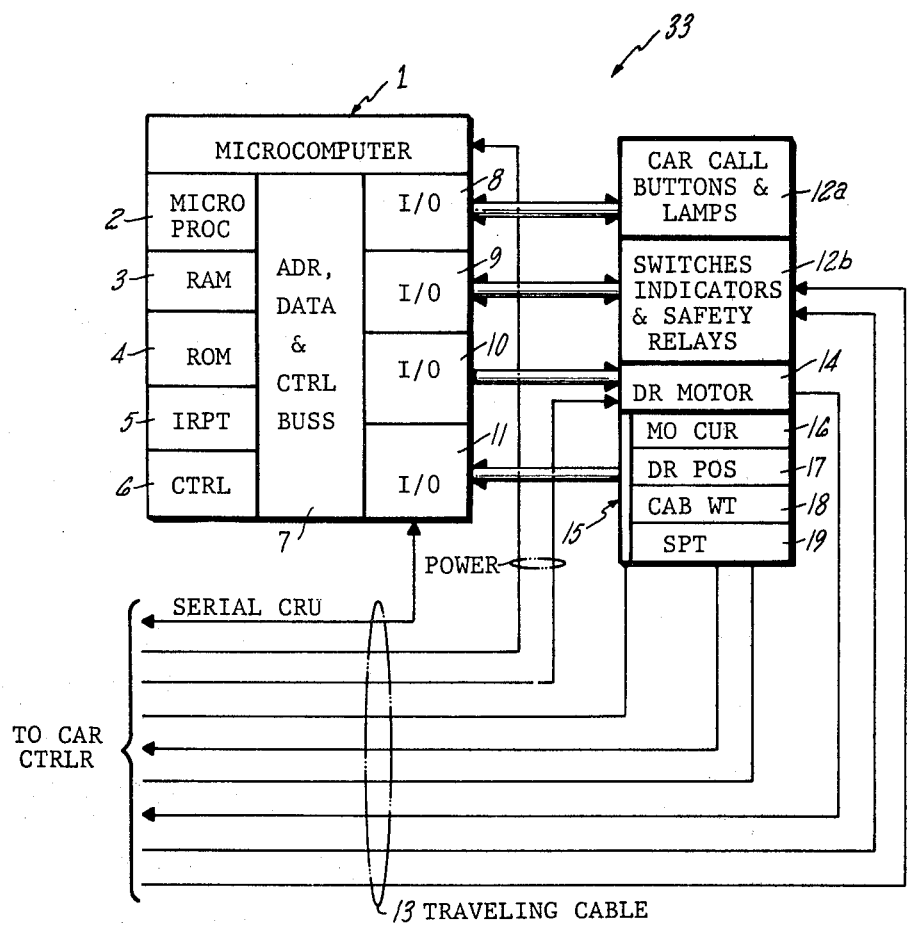
FIG. 2 is a simplified block diagram of a controller which may be utilized in the elevator system of FIG. 1.

Referring now to FIG. 2, a cab controller 33 is illustrated simply, in a very general block form. The cab controller is based on a microcomputer 1 which may take any one of a number of well-known forms. For instance, it may be built up of selected integrated circuit chips offered by a variety of manufacturers in related series of integrated circuit chips, such as the Texas Instruments 9900 Family. Such a microcomputer 1 may typically include a microprocessor (a central control and arithmetic and logic unit) 2, such as a TMS 9900 with a TIM 9904 clock, random access memory 3, read only memory 4, an interrupt priority and/or decode circuit 5, and control circuits, such as address/operation decodes and the like. The microcomputer 1 is generally formed by assemblage of chips 2-6 on a board, with suitable plated or other wiring so as to provide adquate address, data, and control busses 7, which interconnect the chips 2-6 with a plurality of input/output (I/O) modules of a suitable variety 8-11. The nature of the I/O modules 8-11 depends on the functions which they are to control. It also depends, in each case, on the types of interfacing circuitry which may be utilized outboard therefrom, in controlling or monitoring the elevator apparatus to which the I/O is connected. For instance, the I/Os 8, 9 being connected to car control buttons and lamps 12a and to switches and indicators 12b may simply comprise buffered input and buffered output, mulipexer and demultiplexer, and voltage and/or power conversion and/or isolation so as to be able to sense car call button closure and to drive lamps with a suitable power, whether the power is supplied by the I/O or externally. Similarly, the I/O 9 may be required to cause a floor warning gong or an emergency buzzer to sound, to light indicators indicative of elevator operating mode, and to sense switches (such as an emergency power switch, or key switches for express operation and the like), and to operate and monitor door motor safety relays. On the other hand, the I/O 10 must either service an amplifier indicated as part of a door motor 14, or it must provide the amplification function. In such case, the I/O 10 may be specifically designed to be used as an I/O for a door motor 14; but if the door motor 14 includes its amplifier and monitoring circuitry, then a conventional data I/O 10 may be used. Similarly, an I/O 11 communicating with multi-functional circuitry 15, including door motor current feedback 16, a door position transducer 17, cab weight transducers 18, and a secondary position transducer 19 (which indicates the position of the car with respect to each floor landing) may be a general data I/O device if the functions are provided for in the circuitry 15, or it may be a specially-designed I/O device so as to perform necessary interfacing functions for the specific apparatus 16-19.

Communication between the cab controller 33 of FIG. 2 and a car controller (such as car controller 15 illustrated in FIG. 1) is by means of the well known traveling cable 13. However, because of the capability of the cab controller 33 and the car controller 15 to provide a serial data link between themselves, it is contemplated that serial, time division multiplexed communication, of the type which has been known in the art, will be used between the car and cab controllers. In such case, the serial communication between the cab controller 33 and the car controller 15 may be provided via the communication register unit function of the TMS-9900 microprocessor integrated circuit chip family, or equivalent. However, multiplexing to provide serial communications between the cab controller and the car controller could be provided in accordance with other teachings, known to the prior art, if desired.

The traveling cable also provides necessary power to the microcomputer 1 as well as to the door motor 14. For instance, ordinary 60 hz AC may be supplied to the microcomputer 1 so that its power supply can provide integrated circuit and transistor operating voltages to the various chips within the microcomputer 1, and separate DC, motor-operating power may be provided to the door motor 14. Other direct communications, such as between the secondary position transducer and the operation controller may be provided by hard-wiring in the traveling cable. Although not illustrated herein, additional wires for safety switches, power, and the like are also typically provided within the traveling cable. The desirability, however, of utilizing serial, time-division multiplex communications between the cab controller 33 and the car controller 15 is to reduce to two, the number of wires which may be necessary to handle as many as 200 discrete bits of information (such as car direction, request to open the door, car call registrations for particular floors, and the like). However, this forms no part of the present invention and is not described further herein.

Figure 3:
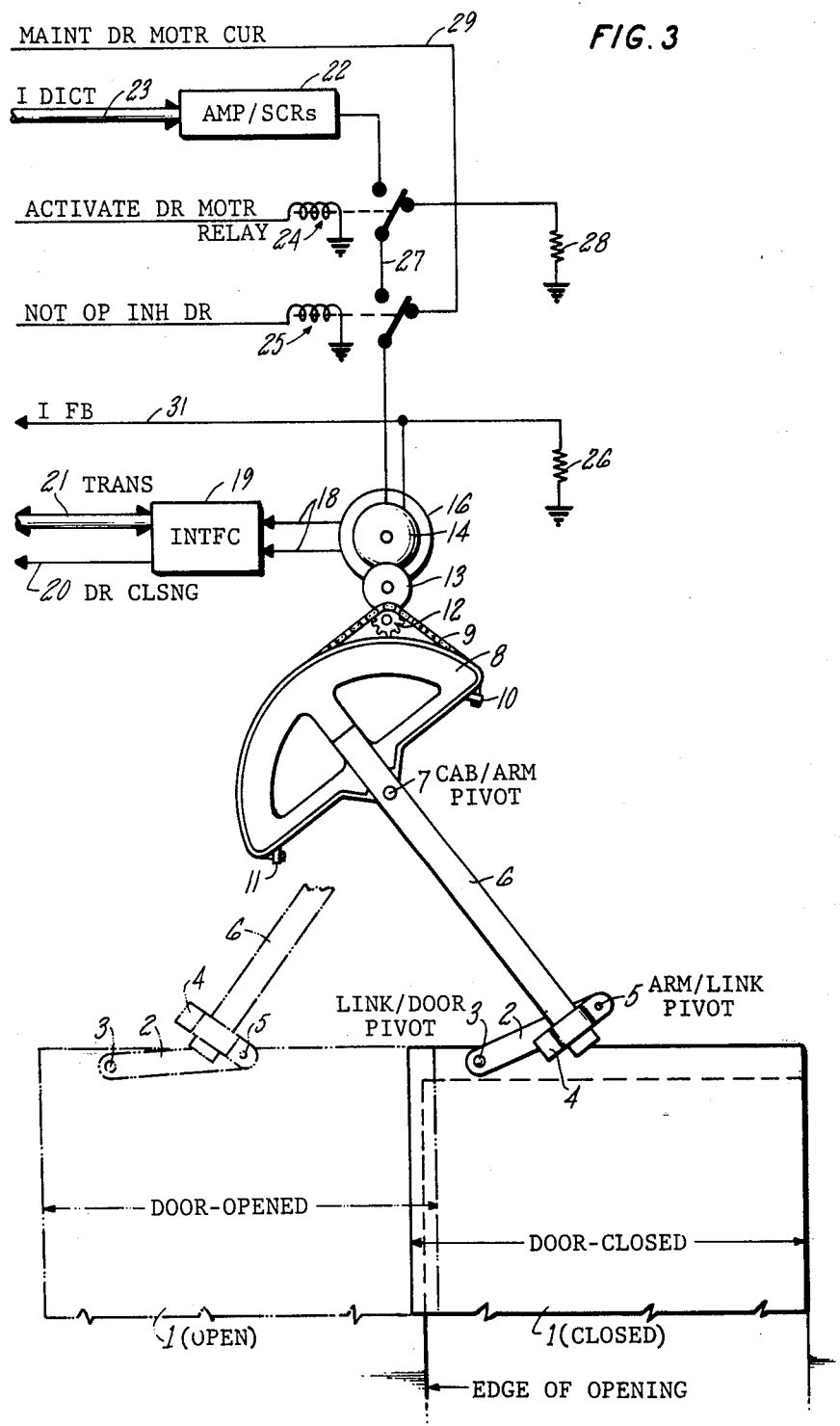
FIG. 3 is a simplified, broken away schematicized illustration of an elevator door operator for use with the present invention.

The door opening and closing controls described herein are capable of being utilized with virtually any type of elevator door which is desired. In order to understand the complexities of door operation more fully, a typical door operator is illustrated in FIG. 3. Therein, a door 1 is shown, partially broken away at the bottom, in solid lines in a fully closed position (to the right in FIG. 3), in heavy dashed lines in a fully open position (to the left in FIG. 3). The door is connected to a link 2 by a pivot 3 which in turn is connected to an arm slider member 4 by a pivot 5. The member 4 has an arm 6 passing there through such that the member 4 must revolve about a pivot 7 of the arm 6 as the arm revolves, but the member 4 may slide longitudinally along the arm 6, in a well-known fashion. The arm 6 is formed integrally with or connected to an arcuate member 8 to which there is connected a chain 9 affixed thereto at points 10, 11. The chain 9 engages a sprocket 12 which is driven through reduction gears 13 by a door motor 14. To open the door, as depicted in FIG. 3, the motor turns in the clockwise direction, causing the arcuate member 8 and the arm 6 to similarly rotate in the clockwise direction about the pivot 7. The arm therefore pulls on the link 4 driving it to the left or open position, which in turn drives the link 2 and therefore the door 1 through the pivot 3. As the door moves toward the open position, the link 2 rotates clockwise about the pivot 3, and the link 4 rotates clockwise about the pivot 5. At the end of travel, in the fully-open position, the links 2, 4, and the arm 6 have the position shown broken away at the left in FIG. 3.

The necessary consequence of the conversion of rotary motion to linear motion, as depicted in FIG. 3, is that the distance (as in centimeters) of the door motion per unit angle of revolution (as in degrees) of the motor 14 varies in dependence upon the actual door position. For instance, it is evident from FIG. 3 that the maximum door motion per increment of motor angle will occur when the door is midway between the open and close position, and will be somewhat less near the fully-opened or fully-closed positions. This variation in linkage is accommodated, as described hereinafter with respect to FIGS. 8, 10, 12, and 20, by means of a map or table of empirically determined values of incremental changes in door position for changes in motor position, as a function of door position.

When the arm 6 is vertical, its weight creates no force on the arm slider member; but when it is in any other position, the weight of the arm 6 affects door motion. During the first half (approximately) of travel, the arm aids motion (in either direction), but it impedes motion during the second half.

The actual door position may be monitored by a door position transducer 16 which is connected to the door motor shaft (or on the same shaft) or may be driven by the door motor in some other suitable fashion, such as a rack and pinion to provide a pair of phase related (direction indicating) bits over lines 18 to interface circuitry 19, which includes means to determine from the relative time of occurrence of the bits on the lines 18 whether the door is closing or opening, and thus provide the door closing flag signal on a line 20, and to sense the number of bits per cycle as an indication of door velocity and transmitting an indication thereof as the TRANS bits on lines 21. This circuitry may take the form of so much of the circuits described in the aforementioned Masel et al U.S. Patent Application as is necessary to acquire direction and count information from a single incremental encoder with quadrature output. The door position is derived by accumulating these bits elsewhere, followed by conversion from angles of rotation to actual door position, all of which is described with respect to FIG. 8, hereinafter.

Although not intended to be an accurate description of the manner in which the motor may be driven, FIG. 3 illustrates that a door amplifier circuit 22 may be provided with a digital value of dictated current on a bus of lines 23 to generate the desired current for the motor 14. The current is applied to the motor 14 only if a pair of safety relays 24, 25 are suitably activated, as described more fully and claimed in a commonly owned copending U.S. patent application filed on even date herewith by Doane, Deric and Roberts, Ser. No. 107,691. And a sensing resistor or the like 26 may provide a motor amplifier feedback current value on a line 31 to the cab contoller 33. More specifically, the safety relay 24 is actuated by the door control routines when no faults or failures are detected by the self health subroutines. Actuating the relay 24 connects a circuit 27 with the amplifier 22. On the other hand, if the relay 24 is disenergized (as shown), it will connect the circuit 27 to a grounded resistor 28 which provides dynamic braking to the door motor, in the fashion long known in the art. The relay 25 is controlled by the operation controller, in the car controller, and is activated when the car controller determines that operation of the door should be left in the hands of the cab controller. But if the car controller senses that operation of the motor should absolutely be inhibited, or vetoed, then the relay 25 will be disenergized (as shown) so as to prevent the amplifier 22 from providing current to the motor 14. And, when in the disenergized state, the motor 14 is connected by means of a direct circuit 29 to the machine room to facilitate control of the motor by maintenance personnel directly from the machine room, such as to effect an emergency evacuation from an elevator cab. A specific condition that would cause the operation controller to disenergize the relay 25 is loss of motive power, with passengers in the elevator, and an inability to force the door open through normal logical control.

Figure 4:
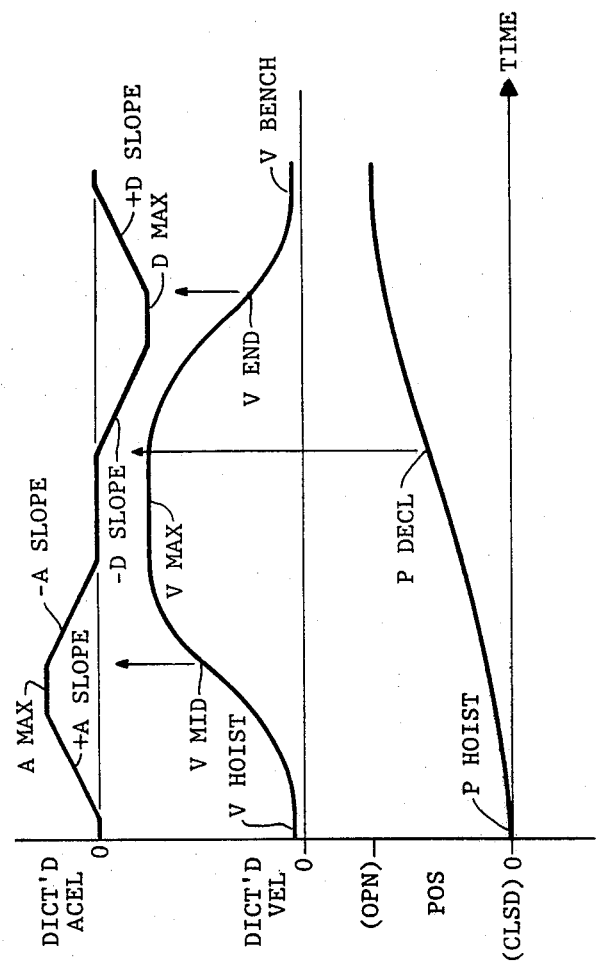
FIG. 4 is an illustration of dictated acceleration and velocity, as well as position, of a time-controlled elevator door opening profile, on a common time base.

Referring now to FIG. 4, a time-controlled velocity profile, in accordance with the invention described and claimed in a commonly owned copending U.S. patent application filed on even date herewith by Hmelovsky and James, Ser. No. 107,695, for the case of the door opening from a fully-closed position to achieve a fully-open position, is illustrated with respect to acceleration, velocity, and position of the door on a common time time base. The configurations in FIG. 4 are relative and qualitative, but do reflect in a meaningful way an opening door velocity profile which has been achieved practicing such invention.

The profile is controlled in part by desired acceleration and rates of change of acceleration, and in part by desired beginning, maximum, and ending velocities. In addition, the profile is controlled in part by position, insofar as changing from acceleration to deceleration along the profile is concerned.

Specifically, the door is initially fully closed and its position is therefore zero. During the first centimeter or so of operation, the cab door will be moving by itself; but at a position of about 2.5 centimeters from being fully closed, it will engage the hoistway door and pull the hoistway door open along with itself. This position is designated herein as P HOIST. Between being fully closed and picking up the hoistway door, the velocity profile is commanded by a fixed, relatively small velocity called V HOIST. This velocity is dictated without regard to any acceleration, and prior to the commencement of the acceleration-control over the accelerating portion of the velocity profile.

As soon as P HOIST is reached at a fixed velocity of V HOIST, the acceleration mode begins by piecewise integration of desired changes in acceleration per cycle, which is essentially a factor of positive jerk (jerk being the third derivative, or rate of change with time of distance, as is well known). For each cycle, the acceleration which has been accumulated has added to it another increment of +A SLOPE, which continues until the maximum desired acceleration is reached; integraton continues, but the acceleration is clamped at A MAX. Thereafter, the velocity has a linear increase with no change in acceleration until a point called V MID is reached. This is a point which is calculated during each profile from the desired V MAX to determine the velocity at which the acceleration should be diminished from maximum toward zero so that the desired maximum velocity will be achieved with zero acceleration. Then, in successive cycles, the acceleration is diminished by the —A SLOPE value of desired decrease in acceleration per cycle (a negative value of jerk) until such time as V MAX is reached. The profile, however, is controlled by the achievement of V MAX, even if the acceleration has not integrated to zero by the time V MAX is reached; and, as in the case described hereinbefore, the negative acceleration slope values will continue to be integrated, and clamped at zero, but will always be irrelevant since the velocity is limited at V MAX.

The profile of FIG. 4 then continues at maximum velocity with zero acceleration until a point is reached called P DECL, a point which has empirically been determined to be a desired point for starting deceleration of the door. At this point, incremental values of deceleration per cycle (—D SLOPE) are accumulated in piecewise integration fashion so as to cause the door to decelerate to a maximum deceleration, at which time the deceleration value is limited to D MAX so that the door velocity decreases linearly. This continues until a velocity, called V END, is reached, which velocity has been calculated in the same fashion as V MID to determine the point where a diminishing deceleration should commence (+D SLOPE) so that the deceleration will reach zero at the time the velocity has reached a desired final or bench velocity of a small magnitude which is referred to herein as V BENCH. The manner of establishing all the variables which may be selected in advance of generating a time-controlled velocity profile is described with respect to FIG. 14 hereinafter. In accordance with one aspect of the invention (described and claimed in a commonly owned, copending patent U.S. application filed on even date herewith by Hmelovsky, and Games Ser. No. 107,803, a method of varying these parameters is described with respect to FIG. 15. The actual profile generation is described with respect to FIGS. 16 and 18, hereinafter.

A closing velocity profile has not been shown; however it would commence at the fully-open position, with zero velocity, since the hoistway door is already engaged by the car door when the doors are fully open. The position in such case starts out at maximum, and decreases to zero, or closed. The profile is controlled by first a +A SLOPE, then A MAX, then a —A SLOPE, then V MAX, then a —D SLOPE, D MAX, and a +D SLOPE which will yield to a V BENCH, as described with respect to FIG. 4 above. In each of these cases, however, the direction and therefore the velocity and the acceleration are inverse from what they would be during an opening profile, in terms of actual door motor current polarity. However, the principals are the same as described with respect to door opening, above.

Figure 5:
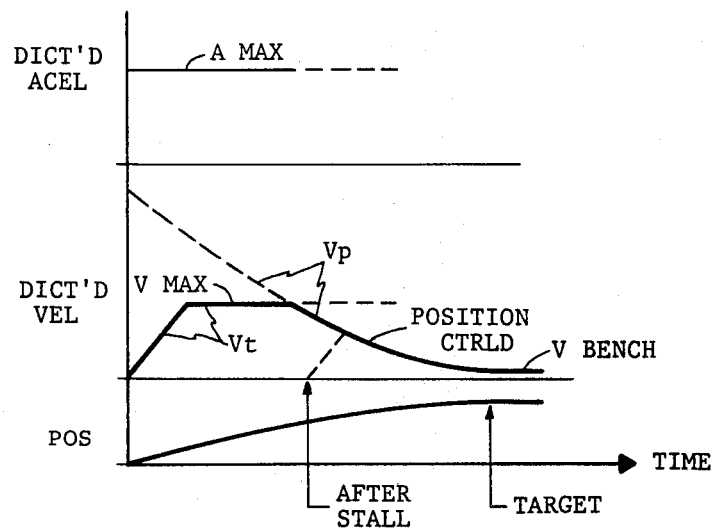
FIG. 5 is an illustration of dictated acceleration and velocity, as well as position, of a position-controlled elevator door opening profile, on a common time base.

A position-controlled velocity in accordance with the invention described and claimed in a commonly owned copending U.S. patent application filed on even date herewith by Shung and Deric, Ser. No. 107,671 is illustrated in FIG. 5. Therein, a door velocity profile, for the opening direction, which is controlled principally by position, is shown. This profile is characterized by four different controlling regions. First, maximum acceleration is used to increase the velocity (Vt) from zero, by piecewise integration of the present velocity plus maximum acceleration (expressed as the desired maximum rate of change of velocity per cycle). This continues until the desired maximum velocity is reached, after which the velocity is clamped at the maximum velocity. The integration of velocity may continue, but the result is ignored due to the clamping at V MAX. Throughout all this time, a second velocity, referred to herein as Vp, is being calculated; this is a velocity that will smoothly bring the door to a desired bench velocity at a desired target position. It is simply some constant times the remaining distance. When this calculated velocity equals the time-controlled velocity (Vt), this takes over in controlling the profile. In a typical case, this will occur at V MAX, at some position away from the target position, where Vp=V MAX. But if there is a door reversal or a removed stall condition or the like, it is always possible that the door will not be able to achieve V MAX before it must begin decelerating in order to reach the desired bench velocity at the appropriate position (target). This is illustrated in FIG. 5 by the heavy dash lines identified with the legend "After Stall". And, with the indicated present position forced to the target position, a slow, bench velocity can be achieved for the entire door motion, if desired for safety reasons.

As is described more fully hereinafter, this door velocity profile may be used in conjunction with the time-controlled velocity profile described hereinbefore with respect to FIG. 4, according to the invention described more and claimed in a commonly owned copending U.S. patent application filed on even date herewith by Hmelovsky and Games, Ser. No. 107,804.

As illustrated in FIG. 6, a complete door control routine will consist of many subroutines to determine operating conditions, such as the position of the car with respect to a landing, commands to open and close the door, the health of various transducers, door reversal devices, and the like, to determine whether the door should be open, opening, closed, or closing, and if door motion is required, to determine whether it should be done at a slow final velocity, in accordance with a velocity profile that is position controlled, or if it should be accomplished with a principally time-controlled velocity profile. And, when the door is impeded or against its open or closed stops, the nature of stall current which should be dictated to the door motor. Various other features are performed in the enhancement of door motor operation, as is described more particularly hereinafter.

The door control routine may be entered from the executive program based upon real time interrupts decoded to the frequency that is required of the door control program, such as about every 16 milliseconds. The program is reached through an entry point 1, and the first subroutine therein 2 is referred to as autonomous mode, which provides for sensing a failure of communication between the cab controller and the car controller, and, when stopped at a landing, opening and closing the doors while turning the lights on and off and sounding a buzzer to frighten the passengers off the car which is described more fully and claimed in a commonly owned copending U.S. patent application filed on even date herewith by Deric, Ser. No. 107,801. In a safety check subroutine 3, various factors which can control the safe response to door motion commands are taken into account (such as the car being close to a landing) to permit commanded door operation only when safe, and to force safe door conditions when necessary which is as described more fully and claimed in said application herewith of Doane, Deric and Roberts. In an initiation subroutine 4, specific door initialization during a power on reset are made, and various conditions are established during normal operations at the start of each pass through the door control routine so as to control the functioning thereof.

In a door position/velocity subroutine 5, the door motion transducer increments are monitored and converted to linear door position and velocity factors, as well as providing a linkage ratio as a function of door position for use in door motor compensation and current calculations. In a door direction subroutine 6, commanded door direction and reversal requests are processed. A compensation subroutine 7 provides motor current compensation components to take into account the weight of the door actuator arm, friction, and the force of the hoistway door spirator or spring which is described more fully and claimed in a commonly owned copending U.S. patent application filed on even date herewith by Hmelovsky, Ser. No. 107,700.

Determination of whether stall current should be dictated to the motor or a velocity profile should be dictated to the door motor is accommodated in a velocity/stall subroutine 8. Stall current is dictated to the door motor in a stall dictation subroutine 9, according to the invention, when stall is indicated by the subroutine 8, and motor current is outputted by a subroutine 9a. Otherwise, the factors for a position-controlled velocity profile may be selected in a position-controlled profile select subroutine 10 or the factors for a time-controlled velocity profile may be selected in a time-controlled profile selection subroutine 11. These are factors such as the maximum acceleration and velocity, final velocity, and conditions for changing from one acceleration or rate of acceleration to another as the door is moved.

Selection of suitable acceleration and velocity factors is performed in a subroutine 12, a position-controlled velocity is dictated in a subroutine 13, and dictated velocity as well as the variance between actual and dictated velocity are provided in a subroutine 14. Actual current is calculated and modified in accordance with specific conditions in the dynamic compensation subroutine 15 and outputted in the subroutine 9a, which completes the door control program.

The door control program of FIG. 6 may return to the executive through a transfer point 16, and then a door health routine 17, including a safety relay subroutine 18, monitors certain conditions indicative of the health of the door operation function, and sets and monitors safety relays that may absolutely inhibit the car motion or door motion in dependence upon the safety conditions of the subroutine 17 or in dependence upon conditions in the operation controller. Normally, the door health subroutine 17, 18 will be performed following the door control routine, in each case. Completion of all of the door control functions will cause return to the executive program through a transfer point 19.

Figure 7:
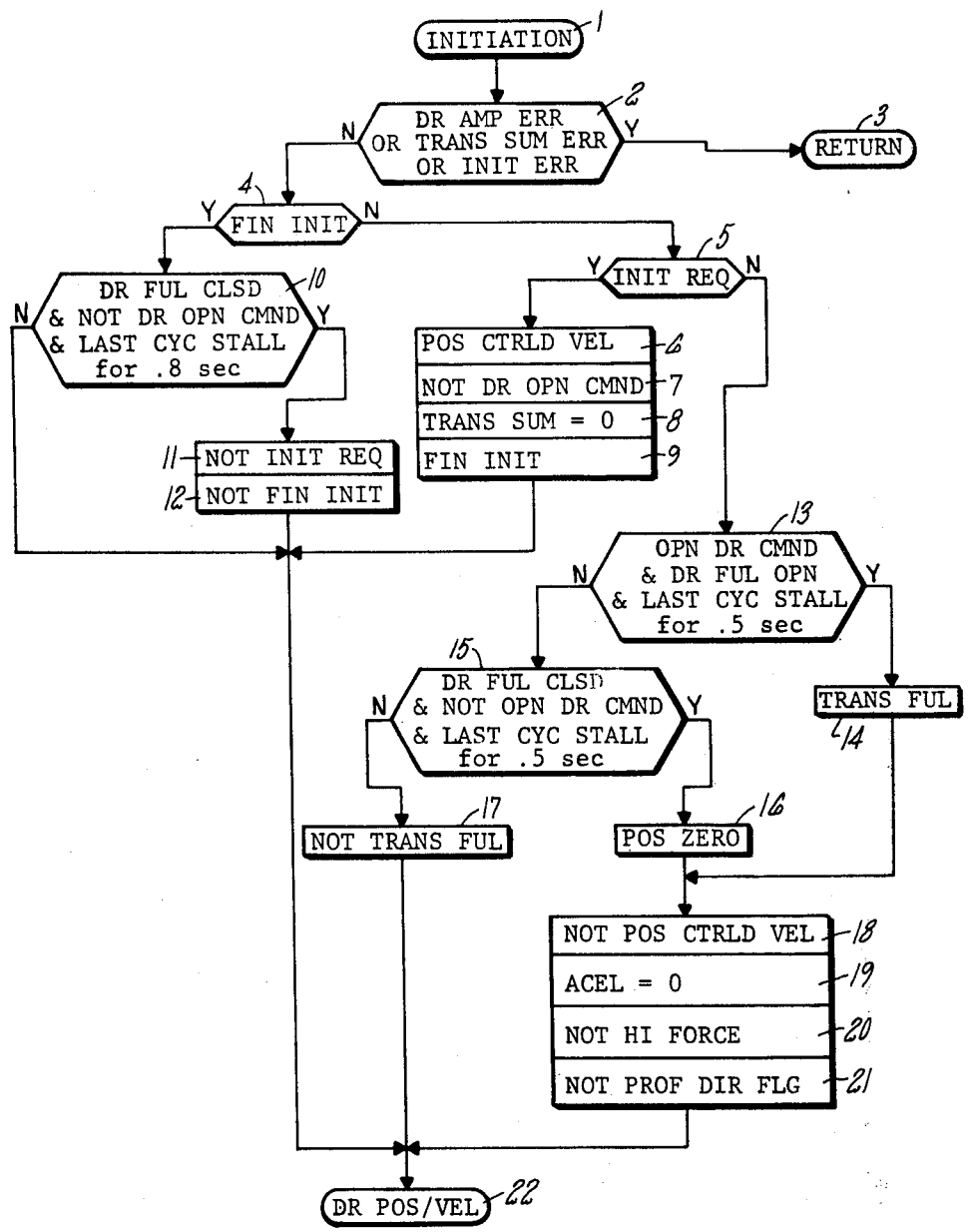
FIG. 7 is a logic flowchart of an initiation subroutine.

Referring now to FIG. 7, the door control routine and the initiation subroutine is entered through an entry point 1. In test 2, any one of three different erros relating to the door amplifier, the transducer sum or excessive initiation time will cause the door control routine to be bypassed through a return point 3. The indications of these errors are all generated in a door health subroutine described with respect to the aforemention application of Doane, Deric and Roberts. But if this test fails, indicating that there is no error, a test 4 determines whether there is a partial initiation in progress. If not, a test 5 determines whether initiation is requested (which occurs during power up, as is described hereinbefore). It there is an initiation request, a step 6 establishes that a position-controlled velocity profile should be utilized rather than a time-controlled velocity profile. Then, in a step 7, a command to close the doors is made, thus ensuring that the doors will remain closed if they are, or causing the direction to be toward closing if they are not fully closed at start-up. And, in step 8, the transducer sum (the accumulation of door position transducer bits) is set to zero, so that the position controlled velocity (step 6), in the closing direction (step 7) will be at the nearly-closed bench velocity (very slow, such as 4 cm/s, and therefore will be safe, regardless of original door position and/or transducer setting. With these tasks complete, that fact is indicated by setting a final initialization flag in step 9.

In the next pass through the subroutine of FIG. 7, test 4 will determine that the final initiation flag has been set, and will cause step 10 to determine if the door is fully closed, the command is to close the door, and the current dictation to the motor has been a stall dictation for the last 0.8 of a second. The door fully closed indication tested in step 10 is provided by a switch which can be activated to indicate door closure only wihtin about a centimeter of full door closure. If these criteria have not been met, then this indicates that the door is not fully closed, and initiation cannot be deemed to be complete; therefore, in the next subsequent cycle, this same test 10 will be made once again, and so forth. Eventually, the door will be closed with a closure command and stall force will be dictated to the motor for 0.8 of a second. Thereafter, test 10 will be positive and this will be an indication of the end of door control initiation so that the initiation request flag is reset in step 11, and having finalized initiation, the final initiation flag is reset in step 12. On the next pass through the door control routine, step 2 will be negative, step 4 will be negative, and step 5 will be negative, reaching a normal (noninitating) portion of the subroutine, which commences with test 13. If this test is affirmative, it indicates that the door is commanded to be open (and thus will stay open), it is fully open, and there has been stall current dictated to the door (maintaining the door open) for at least 0.5 seconds. Under this condition, it is known that the count in the transducer should be a maximum count. This is the count which is accumulated in a counter realted to the door transducer as described with respect to FIG. 3 hereinbefore. Therefore, an affirmative result from test 13 will set a transducer full flag in step 14, which may be utilized in the door health subroutine, described in the aformentioned application of Doane, Deric and Roberts, to determine if the maximum transducer count is reasonable. But if step 13 determines that the door is not fully open, test 15 will determine if the doors have been fully closed, without any command to open, and with dictated stall current for the past 0.5 seconds. If so, this guarantees that the door is fully closed and therefore at a zero position, which fact is registered by setting a position zero flag in step 16. But if tests 13 and 15 determine that the door is neither fully open nor fully closed, this fact is registered by step 17 resetting the transducer full flag (which will naturally occur after the doors have been fully opened but begin to close). In each non-initiating door control routine in which tests 13 or 15 are affirmative, step 18 resets the position-controlled velocity flag because the door may have been driven to the fully open or closed position by a position-controlled velocity profile as a result of reversal or blockage; but, now that the full open or closed position has been reached, the preferred time control profile should be used for the next door excursion. Step 19 ensures that the value of acceleration (an integrated value) to be used in dictating the door velocity begins at zero, each time a new door motion profile is generated after the door is fully open or closed. Step 20 resets a high force flag (which is explained with respect to FIG. 20, hereinafter), because high force would have caused the door to become fully open or closed, but the subsequent motion of the door should be achieved with a normal profile, if possible. And step 21 resets a profile direction flag, which monitors direction change during a door velocity profile, as described with respect to FIG. 9, hereinafter. In each pass through the initiation subroutine, the door control program advances to the door position/velocity subroutine through a transfer point 22.

Figure 8:
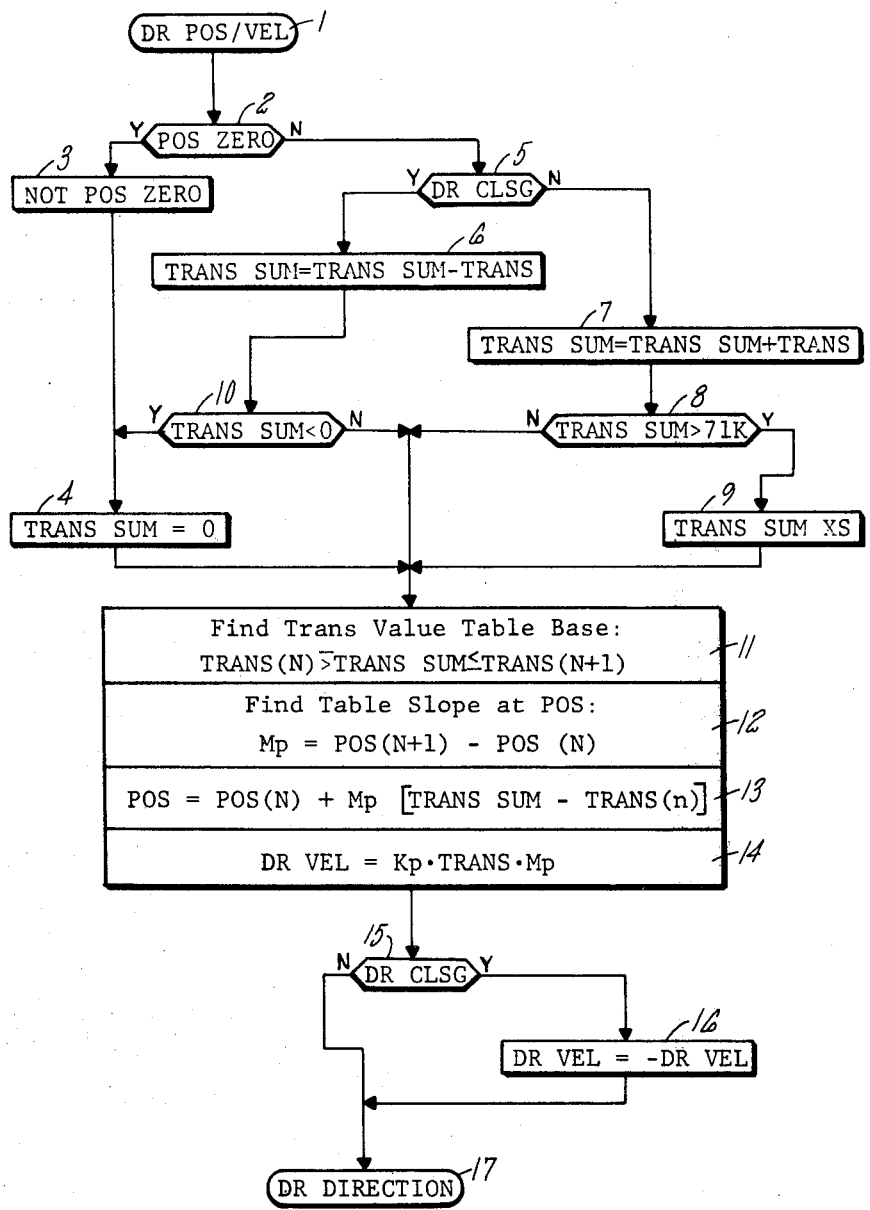
FIG. 8 is a logic flowchart of a door position/velocity subroutine.

The door position/velocity subroutine of FIG. 8 is entered through a transfer point 1, and a test 2 determines if the door has been fully closed by testing the position zero flag (set in step 16, FIG. 7); if so, the flag is reset in step 3 (thus ensuring that this is only gone through one time) and the transducer sum is set to zero in step 4. This is the manner of initializing the door position to zero when it is closed. On subsequent normal passes after the door is commanded to open, test 15 (FIG. 7) will fail so step 16 (FIG. 7) will not set the position zero flag, so test 2 will fail. In such cases, test 5 determines if the door motor direction is such as to provide closing of the door, or not. This is determined by testing a door closing flag, which is generated as described hereinbefore (FIG. 3) with respect to the phase-oriented bits of the door transducer. If the door is closing, the transducer summation (TRANS SUM) is reduced in step 6 by the increment in transducer count since the last cycle (TRANS), but if test 5 is negative, indicating that the door is opening, the transducer sum is increased in step 7 by the increment from the transducer. And, in such case, the transducer sum is tested to see if it is excessive (such as in excess of 71,000 increments) in test 8, and if it is, a transducer sum excess flag is set in step 9 the health routine 17 (FIG. 6). Had the door been closing, test 10 would determine whether a negative sum had been reached, and if so, step 4 would restore it to zero. In the case of failure of step 8 or step 10, no clamping or flagging occurs. In any case, the door position/velocity subroutine continues.

In FIG. 8, the accumulated transducer sum (which increases from zero on opening, and decreases from a near-maximum amount to zero on closing) is converted to a door position, given in a lineal measurement such as fractions of a meter, by first finding, in step 11, the point where the particular current transducer sum falls equal to or between the incremental arguments of a table of door positions as a function of discrete transducer sums. Then, in step 12, a slope (Mp) of position as a function of transducer sum is determined by subtracting the position (N) corresponding to the lower argument determined in step 11 from the position (N+1) corresponding to the higher argument determined in step 11. In step 13, the actual position is determined by taking the lower position and adding to it the slope of the table times the difference between the actual transducer sum and the lower argument of the table determined in step 11. In other words, steps 11 through 13 comprise an operation well known as a linear interpretation, discrete table lookup, where the slope of interpolation is determined by the discrete values of the table, rather than being already provided. This requires additional calculation, but saves considerable storage space in the table, particularly where the table may have thousands of arguments as in the present case. In addition, the slope (Mp) determined in step 3 is used in several other calculations described with respect to FIGS. 10 and 12 to accommodate the fact that the ratio of motor motion to door motion changes as the elbow-linkage flexes (that is, pivots), to a greater or, lessor extent, depending on door position, such door position being indicated by the slope (the rate of change of door position for a given increment of angular position of the motor).

With the positional slope determined in step 12, step 14 can compute velocity by knowing the transducer increment, and the relative change in position per transducer increment (the slope Mp), and an empirically determined positional constant Kp which relates the incremental transducer bits, the door linkage as indicated by the slope Mp and the granularity (or binary bit value) of these factors, to determine a door velocity. Then, test 15 determines whether the door motor direction indicates that the door is closing, which means that the position and velocity are therefore decreasing, and if so, provides a minus sign by 2's-complementing the door velocity value in step 15. If not, the sign is left positive following test 15. Then, the door direction subroutine is reached by transfer point 17 in FIG. 8 which corresponds to entry point 1 in FIG. 9.

Figure 9:
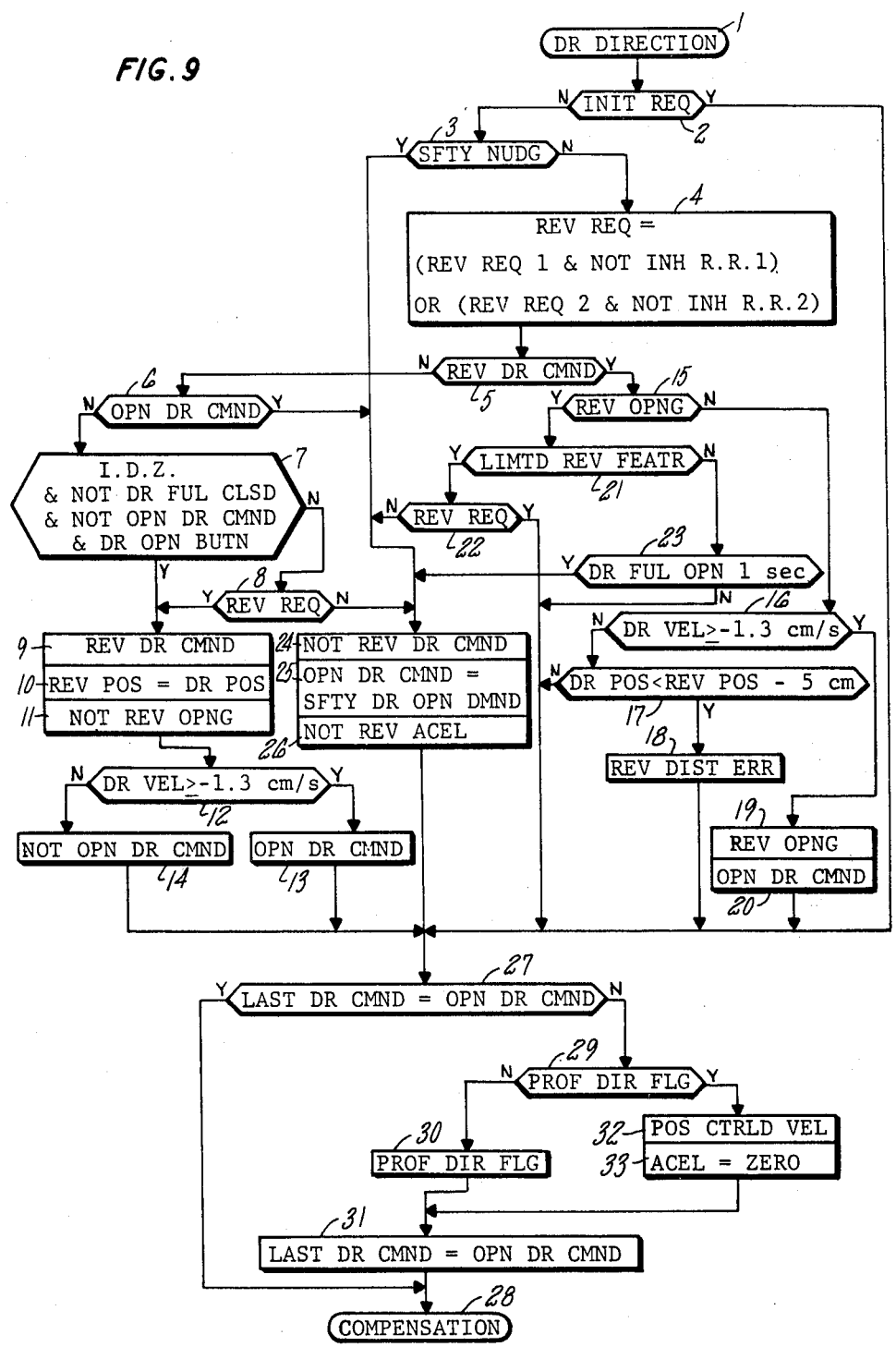
FIG. 9 is a logic flowchart of a door direction subroutine.

Referring now to FIG. 9, the door direction subroutine begins with a test 2 to determine if an initiation request is outstanding. If it is, the subroutine is bypassed to the profile direction change detection portion of the subroutine. But after initiation is completed, each normal running of the door control program will pass through test 2 to a test 3 which determines whether the operation controller and/or the safety check subroutine 3 of FIG. 6 have indicated that nudge is to occur (which is low force current dictation and no door reversals). If nudge is indicated by step 3, the subroutine of FIG. 9 jumps ahead to initially ensure that door reversal operations will not occur (by steps 24-26 described hereinafter), or if a door reversal is already in progress when safety nudge is indicated (such as because the car is slipping away from the floor) the affirmative result of test 3 will cause steps 24-26 to close the door without waiting for the logic and door motion to complete a door reversal, thereby closing the doors rapidly enough to avoid passenger injury as a consequence of car motion or as a result of the car being away from the inner door zone.

If test 3 is negative, then a step 4 will register a reverse request if reverse request 1 is present without an inhibit therefore, of if reverse request 2 is present without an inhibit therefore, provided in each case that reversals have not been prevented by the operation controller or the safety checks subroutine, as indicated by the not safety nudge test 2. Reverse request 1 might be set in response to closing the door safety shoe switches; reverse request 2 might be set in response to breaking a door safety light beam; or one of them may respond to a proximity sensor.

In test 5, a reverse door command flag is tested; since this is set by portions of the subroutine which are reached by a negative result, it must always yield a negative result in a first pass, whether door reversal is requested or not. This, therefore, always leads to a test 6 which determines if the commanded door direction is open. If opening, no reversal is needed. A negative result of test 6 indicates that the door is not opening and reaches test 7, which determines if the car is in the inner door zone, the door is not fully closed, the door direction commanded is closing, but the door open button inside the cab has been pressed. This is a late request for door opening by a passenger, and is processed in step 7 since there is insufficient time to pass the request to the operation controller, have it processed and returned in the form of a door open demand, before the permissible conditions for opening the door could disappear. This feature allows very fast and dynamic response to door open requests from within the cab. If the result of test 7 is affirmative, it is treated as a reversal request (in the same fashion as a reversal request generated in step 4, above). If it is negative, a step 8 will test for a regular reversal request, and an affirmative result from either of them will lead to step 9. Step 9 sets the reverse door command bit which was previously tested in test 5, step 10 registers the actual door position at the current moment as being the position where reversal is requested: this is used at a later point in the door direction subroutine of FIG. 9 (described hereinafter) to determine whether the reversal has occurred within a desired distance. And a reverse opening flag, indicative of the opening phase of a door reversal, is set into its negative state in step 11. Step 11 completes the registration of a request for door reversal as such. Door reversal necessarily happens only if the door is closing when it is desired to have the door open. The first step in that process therefore is to stop the closing door from travel in the negative direction before allowing the door to begin travel in the positive direction. Therefore, a command to actually open the door cannot be issued until the door is either stopped, (no longer closing) or very nearly so. The door becomes stopped from motor current dictated in response to the reverse door command, as described with respect to FIG. 19, hereinafter. In test 12, this condition is initially monitored. If the velocity is more positive than 1.3 centimeters per second in a negative direction, that means it is very close to zero or is actually opening (which can't occur in this circumstance), so that an open door command bit can be set in step 13. In the normal case, however, the pass through step 12 is likely to be negative so that step 14 will ensure that the open door command bit is reset.

On a second pass through the door direction subroutine of FIG. 9, when there is a need to reverse the door, test 5 will be affirmative since the reverse door command flag was previously set in step 9. This will lead to test 15 which must be negative on the first pass through it since the reverse opening bit being tested therein can be set only in a portion of the subroutine reached by a negative response to test 15. This therefore reaches test 16 in which the door velocity is again interrogated, in the same fashion as in test 12, to determine if the door is stopped, or very nearly stopped. If the door has not yet stopped (which is likely to be the case in a first pass through step 16), then test 17 is reached to determine whether the door has taken a distance greater than about five centimeters to stop. This is computed by comparing the reverse position, which was established in step 10, less five centimeters, with the present door position. If the door has gone more than five centimeters as indicated in step 17, and step 16 indicates the door is not yet virtually stopped, then a reverse distance error flag is set in step 18. In the present embodiment, the reverse distance error is not used to govern further control of the door operation, but simply establishes, for maintenance personnel, that the door is taking too long to come to a stop during a reversal; this could lead to analysis of faulty reverse current dictations and the like, and help to ensure more efficient elevator operation. In most passes through step 17, however, the five centimeter distance will not have been exceeded.

During normal door reversal, subsequent passes through the door direction subroutine of FIG. 9 will pass through tests 2, 5 and 15 to reach test 16, when ultimately the door will become essentially stopped so that test 16 will yield an affirmative result. This begins the second phase of a door reversal which is to commence the opening. When test 16 is affirmative, step 19 sets a reverse opening flag and step 20 issues the actual working command to open the door. Note, in retrospect, that the open door command is the actual command which causes the door to in fact be opened. The open door command is generated in normal, nonreversal situations in response to the safety door open demand, as described with respect to this subroutine, below.

In subsequent passes through the door direction subroutine in FIG. 9, test 2 and test 5 lead to test 15. Since the reverse opening flag has been set in step 19, test 15 will thereafter be affirmative, leading to test 21. Test 21 assumes that the embodiment of the invention may have an optional feature which allows limited door reversals, so that reversal only continues while the reversal request (respectively corresponding to reverse request 1 and reverse request 2 in step 4) are continued to be made by the reversing device. If that is the case, then test 21 will lead to a test 22 to determine if the reverse request is still outstanding. If it is, then the reversal process is simply continued by passing through the subroutine. But once that reverse request has ended, then the reversal is deemed to be complete as is described more fully hereinafter.

If there is no limited reversal feature so that any reverse request must result in a full door reversal, then test 21 is negative and leads to test 23. Test 23 determines whether the door has been fully open for one second, or not. If it has, then the reversal process is complete. Either the negative of test 22 or the affirmative of test 23, indicating completion of the reversal process, will lead to step 24 where the reverse door command is reset, the open door command reverts to control by the safety checks subroutine (and/or the operation controller) in step 25, and the reverse acceleration flag (which is set in the select acceleration and velocity subroutine described with respect to FIG. 14 hereinafter, is reset in step 26. Exiting from step 26 completes a door reversal.

Assuming no reverse request or late door open buttons occur, or whenever the door is opening, subsequent passes through the door control routine will cause the door direction subroutine of FIG. 9 to pass through test 2 negatively, step 4 with a reverse request set to zero, step 5 negatively, to step 6. In step 6, in any case where the door is opening, there is no need to create a reversal, so the non-reversing situation is maintained by passing through the end-of-reversal steps, 24–26, to ensure that there is no reverse door command, the door open command is under safety and/or operational control, and there is no reverse acceleration flag. On the other hand, when the door is not opening, and there is no reversal request, test 6 will be negative, test 7 will be negative, and test 8 will be negative, so that the same three steps 24–26 are performed to ensure non-reversing situation.

In the normal case, the door is either commanded to open or it is not commanded to open. When it is commanded to open in the normal case, it is because the operation control has sent down a door open demand. The safety checks subroutine (3, FIG. 6) is utilized in the normal case to cause the safety door open demand to follow the door open demand and step 25 of the door direction subroutine of FIG. 9, causes the open door command itself to follow the safety door open demand. Thus, the open door command is caused to follow the door open demand of the operation controller when the safety check subroutine allows it to do so. If the open door command is set, an opening direction is indicated, if it is not set, a closing direction is indicated. In practice, the open door command is set to zero to cause the doors to close, when they are open and it now becomes time to close; and it is set to zero all the time that the doors are closed and the car is in motion or is parked, in the well known fashion common to elevators of the prior art.

At the bottom of FIG. 9, a portion of the door direction sburoutine tests for the case where door motion has been commanded in one direction, and before that command is completed, a command is received to alter the direction of the door. An example of when this could occur is during independent service. When the independent service key is on, the door is manually opened by depressing the door open button, and is closed if the button is released before the door is fully opened. Thus, if an operator presses the door open button in the cab, and releases it after the opening operation commences, the absence of the door open button being pressed will be communicated to the operation controller, which will convert the operation controller's door open demand to a not door open demand, ultimately causing the not open door command to be generated in FIG. 9 as described hereinbefore. In such a case, there is no knowledge of where the door is when this occurs, so door motion in the new direction must be controlled at a safe velocity in every case. In the bottom of FIG. 9, a test 27 determines whether the door command is the same in this pass through FIG. 9 as it was in a previous pass through FIG. 9. If it is, the door control program transfers to the compensation subroutine of FIG. 10 through a transfer point 28. But if the commanded door direction has changed, step 27 will be negative and a step 29 will test the profile direction flag, which is always set to zero during normal initiation of FIG. 7 when the door is either fully open or fully closed, and therefore known to be before the start of a profile. The start of a profile results from the door being fully open and a change from open door command to not open door command (close), or from being fully closed and a change from not open door command (close) to open door command. Once a profile is started, step 21 of FIG. 7 will no longer be reached because the door is neither fully open nor fully closed. Whichever direction a door profile is being commanded, once the profile has begun, test 27 (FIG. 9) will cause test 29 to be reached and to fail, thus setting the profile direction flag in step 30. And after setting the profile direction flag, a step 31 will cause the last door command to equal the present open door commmand (regardless of whether it is a one, indicating the opening direction or a zero indicating the closing direction). The setting of the flag and equalizing the last command to the present one (setps 30 and 31), establishes the direction of door motion for subsequent determination of direction change before completing a traverse to the opposite stops (fully open or closed). In subsequent passes through the door direction subroutine of FIG. 9, if the door direction is changed, step 29 will be affirmative and steps 32 and 33 will call for position controlled velocity and will reestablish acceleration at zero to permit starting a new piecewise integration thereof, or set it to a new value). This will cause a position-controlled velocity profile, of the type indicated in FIG. 5, to be performed in the new door direction. This profile need not be limited to bench velocity as is the case during initiation, since the position transducer data can be relied upon to cause the profile to ease gently into the fully open or fully closed target position as a function of the velocity being dicated by the distance remaining to go, which is described more fully hereinafter.

Figure 10:
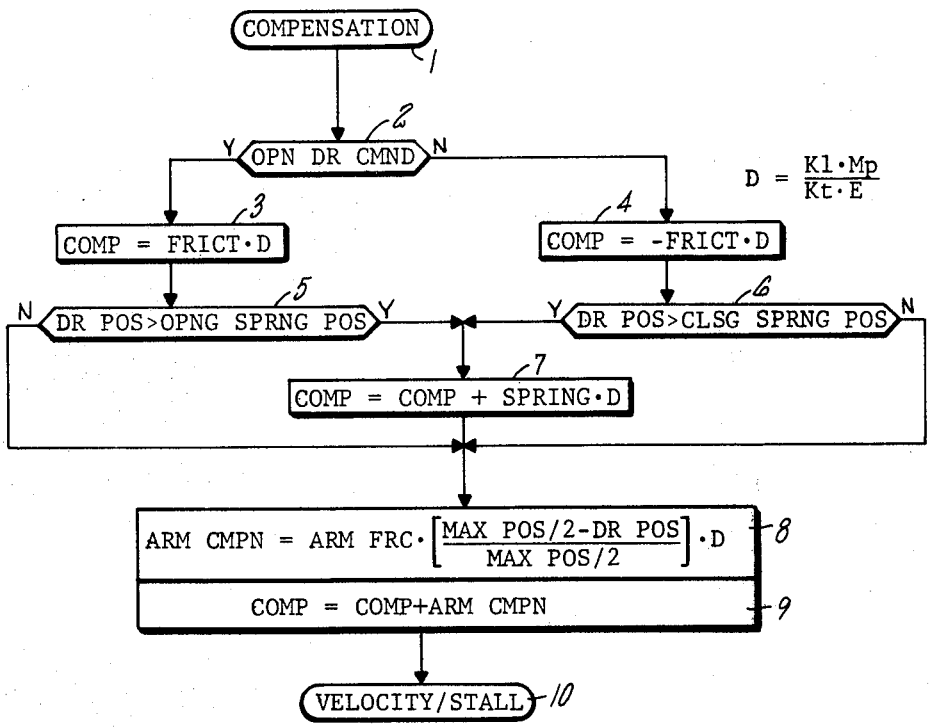
FIG. 10 is a logic flowchart of a compensation subroutine.

The compensation subroutine of FIG. 10 is reached from transfer point 28 in FIG. 9 which corresponds to transfer point 1 in FIG. 10. The compensation subroutine begins with a test 2 to determine door direction to generate a friction compensation factor in step 3 or 4, respectively, which will provide additional force in the direction of door travel (that is positive for the door opening and negative for the door closing). The frictional force can be determined empirically simply by causing door motion, when it is in a loose condition, with a suitable force scale, or by generating trial compensations to determine those that eliminate dynamic friction factors from the door behavior which results from dictated currents. The frictional force is multiplied by the same constant D as is used in any case herein to relate force to current, D being equal to a linkage constant (Kl) that relates the door motor to nominal door position, the slope (Mp) of door motor angular position to door position relationship as described with respect to the door position/velocity subroutine of FIG. 8 hereinbefore, divided by the product of the torque constant (Kt) and efficiency (E) of the door motor.

In the compensation subroutine of FIG. 10, compensation is also provided for the hoistway door closing spirator or spring. Whether the door is opening or closing, corresponding tests 5, 6 determine if the door position is greater than an empirically determined spring position: that is, if the door is open sufficiently so as to be engaged with the hoistway doors and to be flexing the spirator (that tends to keep the hoistway doors closed when the cab doors are not engaging them). However, this position may be different when the door is opening than it is when the door is closing, so separate opening spring position and closing spring position tests must be done in tests 5 and 6. In either case, however, compensation is generated in step 7 which provides a spring force times the constant D as described hereinbefore, which in the case of the door opening is added to the previous compensation since the spring also works against door opening, but in the case of the door closing is subtracted from the compensation previously generated (which is negative) so this is achieved by similarly adding this factor to the negative compensation in step 7. The compensation factor is in terms of current, and is added into the dictated current at the end of the dynamic compensation subroutine, as is described with respect to FIG. 20 hereinafter.

The subroutine of FIG. 10 then provides compensation for the weight of the door actuating arm (7, FIG. 3, hereinbefore), since the weight of the arm, when it is in a high angular position, such as in the fuly-opened or fully-closed position, may provide sufficient force to the door to be equivalent to on the order of 3.5 kilograms; yet when the door is half open, so that the arm is essentially vertical, the force imposed on the door by the weight of the arm is zero. This, of course, varies from door to door and is a more pronounced problem for large doors having large arms then it is for doors with small runs having shorter arms. And, it can be eliminated where the door actuating mechanism does not provide any such force; similarly, if such a force is constant, it may be accommodated along with the frictional force, as described hereinbefore.

In the subroutine of FIG. 10, compensation for the weight of the arm is calculated in a step 8 as a function of a nominal arm force which is empirically determined to be applied to the door, times the factor D described hereinbefore, times a function of position, which is rendered correct for either a fully-opened or fully-closed position, or any point in between, by taking half the maximum door position, subtracting door position from it, and dividing by half the maximum door position. Thus, in a one meter wide, double door, in which one of the doors is moved by the door operator, and the other door is moved by mechanical linkage connected to the first door, each door has a fully opened, maximum door position which is one half meter from the fully-closed position. In such a case, the positional factor of step 22 for a fully-closed door would be one half meter divided by two (which is one quarter of a meter), minus zero (fully closed), divided one half meter divided by two (which is one quarter of a meter), yielding a total positional factor of plus one. And when the door is fully opened, the calculation would amount to a quarter of a meter minus a half a meter divided by a quarter of a meter which yields a positional factor of minus one. Thus, the compensation is automatically corrected for, the sign depending upon which side of vertical the door arm is in, as is illustrated in FIG. 3. And, this arm compensation factor is the same regardless of direction of door motion, being dependent only upon door position relative to the half-open position. Although the actual effect on the door is slightly sinusoidal with respect to door position, it is sufficiently close to linear so that this compensation reduces the effect of the door arm weight to a trivial amount. In a step 9, the arm compensation is added to the compensation provided in steps 3, 4, and/or 7. And the door control program then proceeds to the velocity/stall subroutine through transfer point 10.

Figure 11:
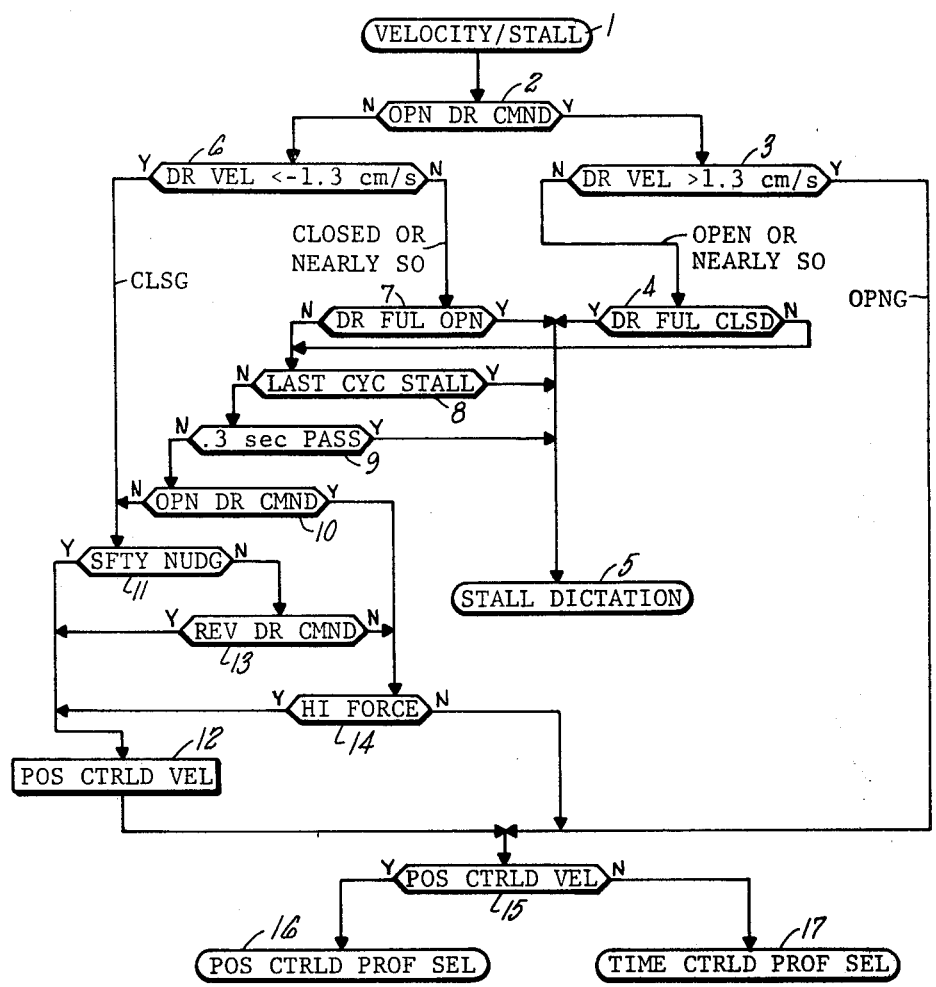
FIG. 11 is a logic flowchart of a velocity/stall subroutine.

The velocity/stall subroutine illustrated in FIG. 11 determines whether the door control should dictate a stall current to the door, such as when the door is being nudged against a blockage, or when it is fully opened or fully closed against stops (to maintain the door in that position with a suitable force, even though no door motion is possible). That is to say, current will be supplied to the motor so that the motor attempts to drive the door further against the blockage, but the motor does not turn at all, and the door does not move, except when the direction of stall current is reversed. Or, in the alternative, the velocity/stall subroutine of FIG. 11 may determine that a normal (time controlled) door opening or door closing can be performed, which can only occur when the doors are initially fully closed or fully open, respectively. Or, the subroutine may determine that a position-controlled velocity profile should be employed due to the fact that the door position is not known, or other conditions prevent the assumption that a full, fast door opening or closing should occur, as is described more fully below.

The velocity/stall subroutine is reached through an entry point 1 in FIG. 11, which corresponds to the transfer point 10 at the bottom of FIG. 9, and begins with a test 2 to determine simply which door direction is involved. If test 2 is affirmative, the door is open, to be opened or opening; but if test 2 is negative, the door is closed, to be closed or closing. Assuming the door direction is open, test 3 will determine if the door is traveling faster than about 1.3 centimeter per second in the positive direction: if not, the door is nearly stopped and therefore is nearly open; but if test 3 is affirmative, the door is still within its higher speed range of its opening profile. This is indicated by the legends on either side of test 3 in FIG. 11. If test 3 is negative, meaning the door is very nearly fully open, then test 4 will determine whether the door is fully open or not. If so, then stall dictation of motor current is indicated, and the door control routine will advance through a transfer point 5 to the stall dictation subroutine described hereinafter with respect to FIG. 12.

In a similar fashion, if test 2 of FIG. 11 indicates the absence of the open door command, then the door direction is close, and test 6 will determine if the door speed is more negative than about −1.3 centimeters per second and if so, an affirmative test result indicates that the door is closing; but if not, this means the negative velocity is very slight so that the doors are either closed or nearly so. Then, a test 7 determines if the doors are indicated as fully closed by the door fully closed switch.

If so, stall dictation is effected through the transfer point 5.

If either test 4 or 7 is negative, when the doors are nearly closed or open, then a test 8 will determine if the last cycle was a stall cycle (that is, was the current dictation to the motor in the previous pass through the door control routine dictated for stall or not). If it was, this indicates that the door is being finally opened, or finally closed, with stall dictation, and this will be continued until the full open or full closed condition is reached. But if not, then a test 9 is performed to see if, with the door nearly open or nearly closed, stall has been indicated for about the past 0.3 seconds. If so, then stall can be initiated. This means that as the door approaches the steps, the speed may be jerky, and may dip below the 1.3 cm/s level, without shifting back and forth between stall and velocity modes. But when the speed is low once, test 9 will transfer to stall and test 8 will keep it there. If the doors are nearly open or nearly closed and still in a velocity profile, and 0.3 second has not yet passed in this condition, the stall mode will not be entered. Tests 8 and 9 provide the hysteresis of the present invention then test 10 will determine whether an open or closed direction has been commanded for the door, and the case is exactly the same as if the doors are moving rapidly. Thus, in any case where the door is closing, as determined by tests 2 and 6 or by test 10, a test 11 will determine whether nudge has been ordered by the safety check subroutine, and if so, a position-controlled velocity profile is ordered in step 12. If not, a test 13 determines whether or not door reversal is commanded, and if it is, a position-controlled velocity profile is commanded by step 12. If opening, or closing without nudge or reversal, a test 14 interrogates the high force flag; if excessive motor current has been dictated, indicating blockage, a position-controlled velocity profile will be commanded by step 12.

These are cases where a normal, principally time-controlled velocity profile for door motion cannot be used. Since a nudge can overcome blockage midway of door opening, a reversal is always partway open, and high force indicates other than a freely-accelaratable door, the safe, position-controlled velocity profile is used.

In cases other than stall, test 15 of FIG. 11 determines whether a position-controlled velocity profile has been commanded (such as in step 12), and if so, selection of profile variables is made by transfer to the position-controlled profile selection subroutine (FIG. 13) through transfer point 16; if not, transfer point 17 directs the door control program to the time controlled profile selection subroutine of FIG. 14.

Figure 12:
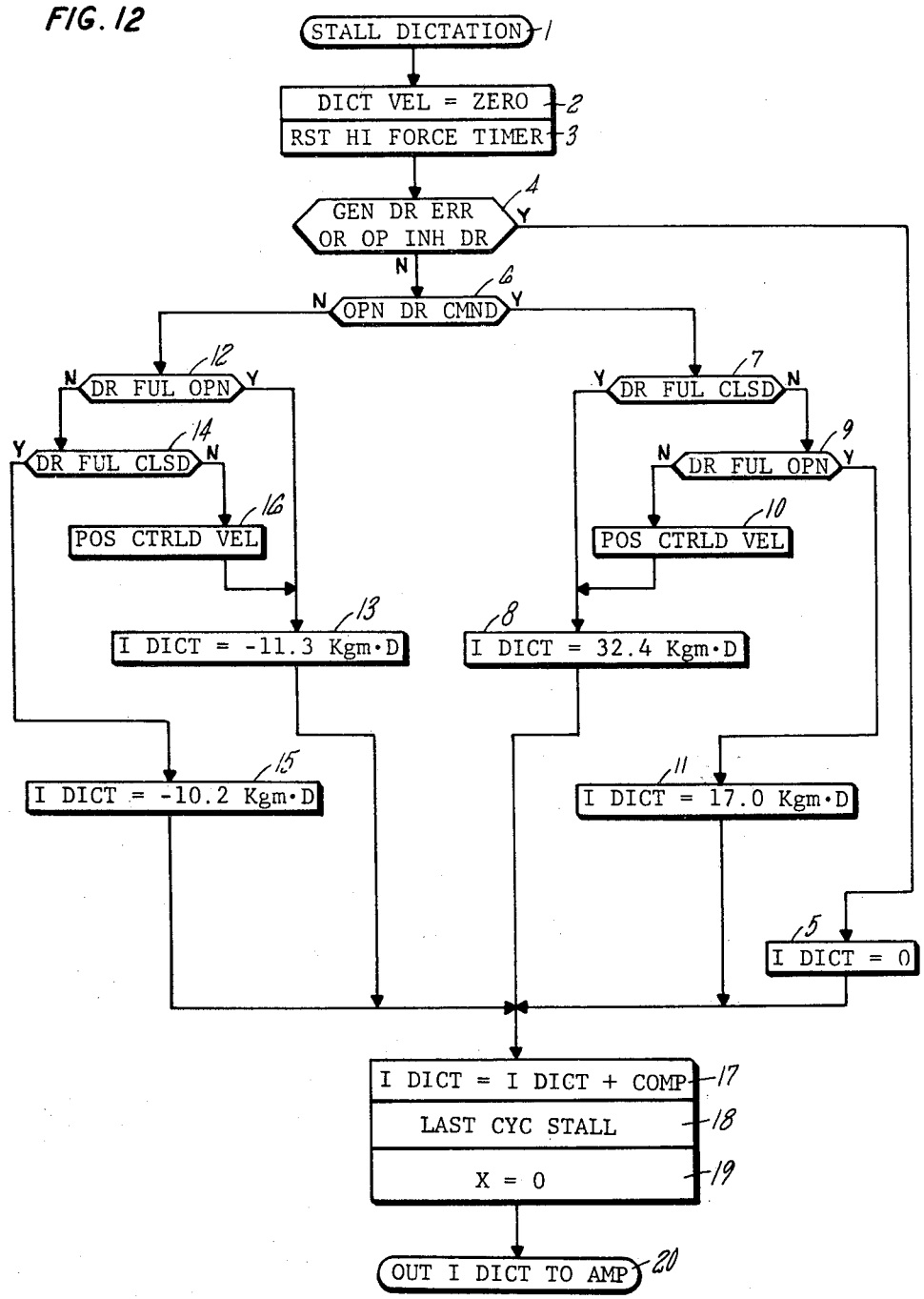
FIG. 12 is a logic flowchart of a stall dictation subroutine.

Referring now to FIG. 12, dictation of stall current is effected by the stall dictation subroutine which is entered through an entry point 1, the first step 2 of which is to set the dictated velocity equal to a value of zero, so that a profile beginning after stall will start at zero. It is door blockage, from a person or object, or from the doors being fully open or fully closed, that causes a stall current to be dictated to the motor; but if the stall cycle resulted from high force, as described in the dynamic compensation subroutine (FIG. 20) hereinafter, subsequent cycles could sense high force (door blockage) only once, and make it through the previously set high force time; therefore, step 3 of FIG. 12 resets the high force timer of FIG. 20.

Because of the possibility of injury to persons who might be within the door when closing is commanded, a test 4 is made to determine if the door power amplifier is disconnected from the door motor; if so, when reconnected, it should start with zero current. And even if opening is commanded, there is no need to perform any further steps of FIG. 12 if the motor is disconnected. So, if it is, the dictated current is caused to be zero in step 5, so that when the door amplifier resumes operation, it will not be rapidly accelerated and perhaps cause injury. But if the door motor is not out of operation, as indicated by a negative result of test 4, then a test 6 of FIG. 12, determines the opening or closing status of the door. If the door is opening, test 7 determines whether the door is fully closed. If it is, it is just being commanded to open, and should be able to follow a normal velocity profile. Therefore, a rather high force (32.4 Kgm) is permissible, the service door, when opening, will not hurt any passengers. This force is commanded by a step 8. But if the door is commanded open when it is not fully closed, and stall dictation is indicated, then it is either due to blockage, or due to already being fully open. Thus, a test 9 determines if the door is fully open or not. If it is, then step 8 dictates a stall current that is necessary to generate 17.0 kilograms of force on the doors, using a factor, D, which is equal to the product of a linkage constant (Kl), between the door motor and the door itself, the slope (Mp) of the position as a function of door motor rotation (which is derived as described hereinbefore with respect to FIG. 8), all divided by the torque constant of the motor (Kt) times the efficiency (E) of the motor. This is a limited force which is just sufficient to keep the door open against the steps.

If the door is not fully open, then the stall current is being dictated because of a door blockage, rather than because the door is fully open. In such case, once the stall is removed, door velocity must be dictated from some door position other than fully open, so as position-controlled velocity profile will be required. For this reason, position-controlled velocity will be set in step 10. And, dictated current to yield a force of 32.4 kilograms on the doors is generated in step 11. If test 6 is negative, the same functions are performed for the closing door as described with respect to tests and steps 8, 10 and 11 in the case of an opening door: if test 12 is affirmative, the closing command is calling for a normal door closing, using a normal velocity profile. A step 13 sets the current to be dictated as that for −11.3 Kgm, which is a force permitted by elevator codes in case a passenger should block the door. If the door is not fully open, then test 12 is negative and test 14 determines if it is fully closed; if so, current for −10.2 Kgm (in the closing direction) is called for by step 15, to hold the door closed. But if not, then there must be a blockage, so the door cannot follow a normal profile in the next pass, and a step 16 sets the position controlled velocity flag, and step 13 orders current for −11.3 kgm. Notice that the closing forces are smaller than the opening forces in order to reduce the possibility of injury, and because the hoistway door spirator opposes opening, but may aid closing. These forces will vary in various elevator installations. If the doors are not fully closed, as may happen if the doors are pried open by pranksters, a faulty time-controlled profile is avoided by step 16 ordering a position-controlled velocity.

In step 17 of FIG. 12, the compensation current component generated in the subroutine of FIG. 10a is added to the dictated current. Since the stall dictation subroutine is entered only during a stall cycle, regardless of which stall current (or zero) is dictated, step 18 will set the flag to indicate that the last cycle (this one) was a stall cycle, which affects many subroutines in the door control program. The integral gain current (X, which is described in the dynamic compensation subroutine of FIG. 19 hereinafter) is set to zero in step 19, and the dictated current is outputted to the amplifier in the output I DICT to amplifier subroutine 9a (FIG. 6) through transfer point 20. The reason that the integration current is set to zero at this point is that in event that the next cycle is not a stall cycle, the integral gain current factor (X) will have been reset to zero to commence a fresh integration when a normal door velocity profile may be dictated. When stall dictation is utilized, no further door control operations are required, so the executive program can be returned to, through the return point 16 (FIG. 6).

The matter of actually commanding a fully closed door to open, in a normal case, begins with the operation controller sending a door open command (DR OPN CMND) to the cab controller via the communication link and the safety door open demand will be set in the same way. In FIG. 9, step 25 causes the open door command (OPN DR CMND) to follow the safety door open demand. In FIG. 11, test 2 then changes from negative to affirmative; the door velocity is zero, so test 3 is negative; the door is fully closed so test 4 is negative. But, the last cycle was stall, so test 8 is affirmative, and another stall dictation is commanded. In FIG. 12, test 6 is now affirmative for the first time, but test 7 is affirmative because the door has not yet moved away from its fully closed position, and so current is dictated for 32.4 kgm of force. In one or two cycles, this will accelerate the door to more than +1.3 cm/sec, so test 3 in FIG. 11 will soon be affirmative; with test 15 negative, the actual time-controlled velocity profile will begin.

The case is similar for normal door closings. Thus, the door motion, for a normal profile, always commences with a reversal of stall current dictation, and shifts into the profile after a minimal velocity (tests 3 and 6, FIG. 11) is reached. When reversed stall current is commencing a door excursion, if the indicated velocity is noisy, and test 3 or 6 (FIG. 11) is momentarily overcome, the velocity profile will in fact be reached; but the disappearance of the noise, resulting in a subsequent negative result of test 3 or 6 will not cause stall to resume due to the hysteresis created between tests 8 and 9, as described hereinbefore, which will cause the velocity profile to be maintained, unless 0.3 seconds elapse, which will not normally ever happen because only about 0.2 seconds are needed to really exceed 1.3 cm/sec with 32.4 or −11.3 kgm (steps 8 or 13, FIG. 12) of force on the door.

One feature which is obtained by the characteristics of door control described with respect to FIG. 11 and 12 is that, in the opening direction, pulsed nudging is automatically achieved, for cases where some form of blockage, such as debris in the path of the door, is inhibiting door motion. If the door should stall when it is partially open, the hysteresis described with respect to tests 8 and 9 in FIG. 11 will cause stall to occur 0.3 seconds after the first time that the speed decreases below about 1.3 centimeters per second. And once the stall is achieved, test 8 will retain the stall condition; but if the impediment is moved by the stall current, that which in step 9 of FIG. 12 amounts to 32.4 kilograms of force on the door (quite high), then the velocity may exceed 1.3 centimeters per second so that test 3 in FIG. 11 will be affirmative. This in turn will cause a position-controlled velocity which will begin to generate a dictated velocity profile, with initial forces which are much lower than the opening stall dictated current force of about 32.4 kilograms. And if the object again impedes, so that the velocity reduces below 1.3 centimeters per second, then the stall hysteresis will again come into play and again apply the high, opening stall force of 32.4 kilograms. The net effect is a transfer between low velocity profile force and high opening stall current force, at no greater than 0.3 second switching rate.

As described hereinbefore with respect to FIG. 11, if stall dictation is not reached through a transfer point 5, then position-controlled velocity profile selection or time-controlled velocity profile selection may be reached instead. If position-controlled velocity profile selection is reached through transfer point 16, it will lead to the entry point 1 on FIG. 13. The first step of this subroutine is to test whether the door is opening or closing in test 2 of FIG. 13. In either case, the next tests 3, 4 determine whether or not a heavy hoistway door is indicated for this particular floor. This may be achieved by ANDing a heavy door floor map with a committed floor pointer (from the operation control). And then, in the selected one of the steps 5–8 a register for maximum acceleration (A MAX) is loaded with a predetermined value of acceleration for position-controlled velocity for the case of closing with a light door, closing with a heavy door, opening with a light door or opening with a heavy door, respectively. And in related steps 9–12 a maximum velocity (V MAX) register is set with predetermined value for velocity for a position-controlled profile for the case of the door closing with a light door, closing with a heavy door, opening with a light door, or opening with a heavy door, respectively. Then, in step 13, the slope of the acceleration vs. time profile of the door motion, as described with respect to FIG. 5 hereinbefore and FIG. 16 hereinafter, is set to equal the value of A MAX which has just been determined in step 5 or 9. Then, the door control program will advance into the select acceleration and velocity subroutine described hereinafter with respect to FIG. 16 through transfer point 14.

As described hereinbefore with respect to FIG. 11, if neither stall current dictation nor a position-controlled velocity profile are selected, then the door control program will proceed, through transfer point 17 at the bottom of FIG. 11, to the time-controlled profile select subroutine, through entry point 1 in FIG. 14. As in the case of profile selection for the position-controlled velocity profile described with respect to FIG. 13, several tests 2–4 determine whether the door is opening or closing, and whether it is heavy or not, so as to load, in step 7, a corresponding plurality of variables listed in the lower right of FIG. 14 for convenience, which includes maximum acceleration, plus and minus acceleration slopes, maximum deceleration, plus and minus deceleration slopes, the position where deceleration begins, the maximum velocity, and the bench (or final) velocity, all as described with respect to FIG. 4 hereinbefore. However, these variables are loaded only during the first cycle of a normal door profile as determined by last cycle stall tests 5 and 6; when the last cycle was not stall, this loading of variables is bypassed.

In addition, the subroutine of FIG. 14, in the case of door opening, loads two additional variables which include the position at which the car door, when opening, will pick up the hoistway door, and the velocity to be used (some small velocity) during the first centimeter or so of door travel before the hoistway door is picked up. These variables are loaded for light and heavy doors in selected steps 8 through 11.

The profile controlling parameters which are established in steps 7-11 may be modified by a profile modification subroutine, indicated at 12 and 13 in FIG. 14, which is described hereinafter with respect to FIG. 15.

In the profile selection subroutine of FIG. 14, when the door is to move in the opening direction, a test 14 determines if the door has reached the position where it will pick up the hoistway door; if it has not, then time dictated velocity, Vt, is simply set to be equal to a hoistway door pickup velocity in a step 15 and the slope is set to zero in a step 15a. Other than the slow initial opening velocity before picking up the hoistway doors, the routine in FIG. D9 is the same for opening as it is for closing; but the parameters selected and the sense, or polarity, of parameter comparisons differ. Specifically, when the door is opening, a test 16 initially determines that the velocity has not reached V MID, which is a velocity calculated in FIG. 15 hereinafter, to be that which is reached during the increasing acceleration from zero to A MAX, and therefore the velocity which, as the acceleration decreases from A MAX back to zero, will cause V MAX to be reached with zero acceleration, as described with respect to FIG. 4, hereinbefore. Until the velocity reaches V MID, as determined in test 16, the acceleration slope (jerk) used to integrate acceleration for dictated velocity will be +A slope, as set in step 17. And, since test 19 is initially negative, step 20 causes the maximum acceleration to be A MAX, as set in one of the steps 7. This will result in integrating from zero acceleration and velocity (or hoist velocity when the doors are opening) to a maximum acceleration. And maximum acceleration will be reached and stabilized even though the slope factor is still set at +A slope. When maximum acceleration is reached, as is illustrated in FIG. 4, the velocity continues to increase linearly with time until the point V MID is reached, as determined in test 16. Then, because the slope is a negative slope set in step 18, it will reduce the acceleration of the door, so that the velocity begins to taper off. When the velocity reaches V MAX, the acceleration should be zero, but if it is not, it doesn't matter since it is not allowed to cross zero, and since the velocity will be held at V MAX and the slight discontinuity in smoothness which may result is not important to the door motion. When V MAX is achieved, the doors move at the constant, maximum velocity until the door reaches a position defined as the deceleration position (P DECL). Since this is reached before the door velocity will decrease at all, it cannot initially be less than the velocity when reduction in deceleration is to occur (V END), and a test 21 will initially be negative so that a step 22 will set the slope equal to the value of —D SLOPE which was set in one of the steps 7, for opening either a light door or a heavy door. And, since the deceleration portion of the door profile has been reached, the maximum acceleration value is changed to the deceleration value, D MAX in step 23. However, this value is not used until the successive, piecewise integration of —D slope causes D MAX to be reached. And then the velocity is decreased linearly by step-by-step integration of D MAX until test 21 indicates that the door velocity has decreased below V END. Then, the slope is changed to +D slope in step 24 of FIG. 14, so that the velocity decreases less rapidly, and will gradually reach the bench velocity (which is the final velocity after deceleration). This is achieved by designing the profile so that the area under the acceleration curve is greater than the area under the deceleration curve, by an amount equal to a desired, small final velocity at the end of the run to allow the doors to drive gently into the fully open (or closed) position, as described more fully and claimed in a commonly owned copending U.S. patent application filed on even date herewith by Hmelovsky, Ser. No. 107,694. Then, current dictation changes to stall, dictation which has been described with respect to FIG. 12, hereinbefore.

The time-controlled profile selection subroutine of FIG. D9 generates the same sort of profile for closing the door, it being borne in mind that the A MAX, +A SLOPE and —A SLOPE are all on the negative side, and the D MAX, +D slope and —D slope are all on the positive side, when the velocity being dictated is in the negative (closing) direction. In such case, a test 25 determines if the door velocity being dictated is less than V MID, which it is not, initially; as long as this is true, the slope equals +A slope (which is, however, a negative number since the door will be accelerating in a negative or closing direction). And, the door position is initially greater than the deceleration position (more, positive or open) so that a test 27 will be negative, step 20 will therefore set the maximum acceleration to A MAX (a negative number for accelerating the door in the closing direction). Eventually, step 25 will be affirmative when the door is at a negative velocity which exceeds V MID, so that a decreasing negative acceleration is selected in step 28 to allow the acceleration to reduce to zero with a desired maximum negative velocity. At this point in time, test 27 will initially be negative so that the acceleration value of step 20 remains unchanged. Ultimately, step 27 will be affirmative when the door has closed sufficiently so that it is at a position lower (more nearly closed) than the deceleration position which has been set for it. Then test 27 will be affirmative so that test 29 will check to see if the velocity has decreased sufficiently to begin tapering off the deceleration. Initially, this test fails so that step 22 causes the slope to be the increasing deceleration slope, and at this point, the maximum acceleration is changed to the maximum decelerating value (which in this case is a positive acceleration to decelerate the negative velocity). After maximum deceleration is reached in the closing direction, eventually, the negative velocity is reduced (more positive) to V END, so that test 29 is affirmative, and the slope is changed from —D slope to +D slope in step 24. Since this takes the deceleration away from maximum, the deceleration will be tapered off and cause the velocity to end up at a negative bench (final) velocity when the doors are almost closed. Testing of dictated velocity (Vt) rather than actual velocity (which can vary in each operation of the door) assures a known relationship between V END, +D SLOPE, and the desired V BENCH. Regardless of which portion of the subroutine illustrated in FIG. 14 is utilized, the door control program advances in each cycle to the select acceleration and velocity subroutine of FIG. D16 through a transfer point 30 in FIG. 14.

Figure 15:
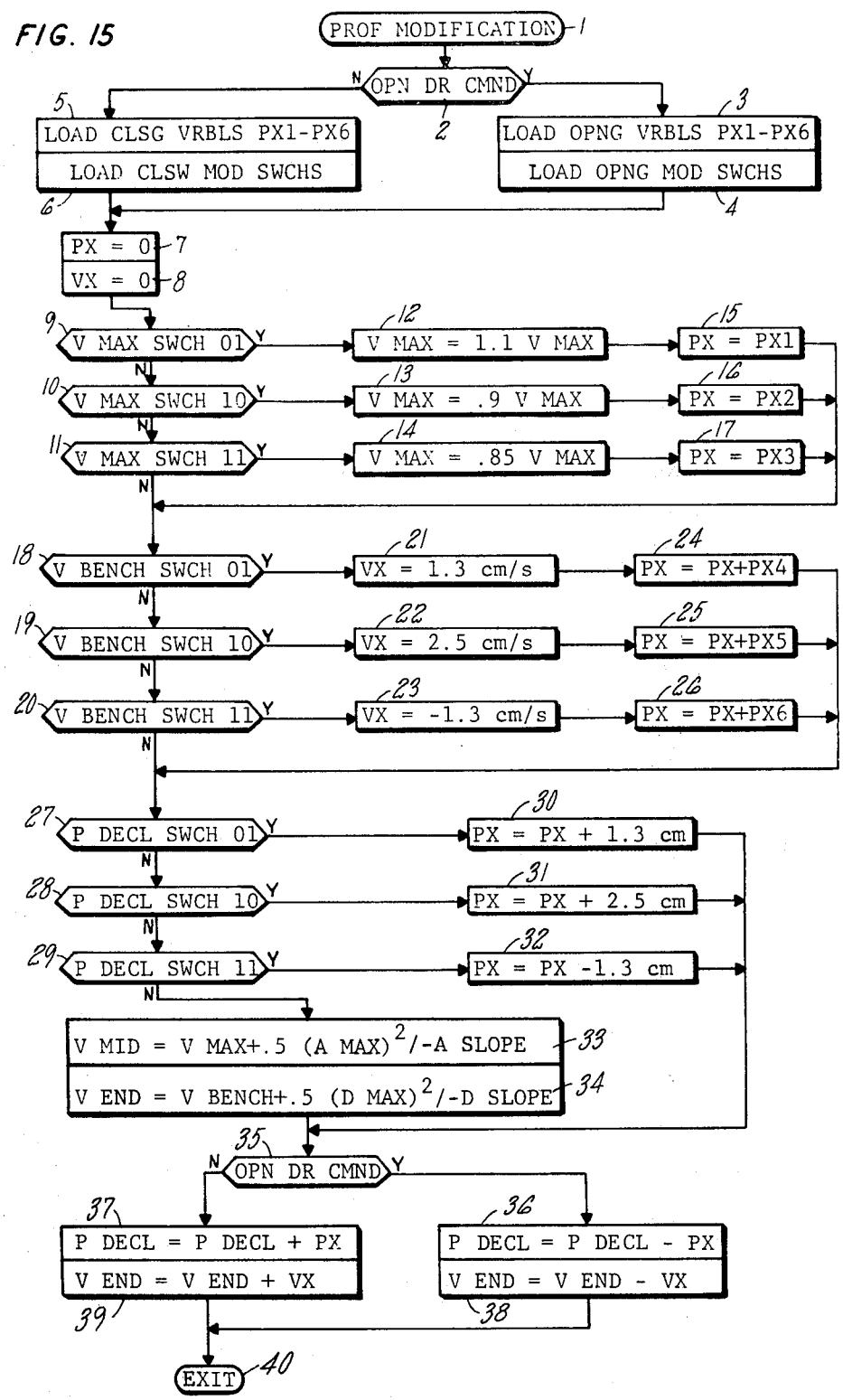
FIG. 15 is a logic flowchart of a profile modification subroutine.

In the middle of the time-control profile selection subroutine illustrated in FIG. 14, reference is made to the profile modification subroutine (12, 13) which is shown in FIG. 15 and is described more fully and claimed in the aforementioned application of Hmelovsky and Games, Ser. No. 107,803. In FIG. 15, the profile modification subroutine is reached through an entry point 1, and test 2 determines the door direction. If the door is open, steps 3 and 4 will load variables, and will read in from I/O, switch settings relating to the opening direction; if test 2 is negative, steps 5 and 6 will load variables and switch settings relating to the closing direction. It is assumed in this embodiment that the switches are typical panel switches, such as dual in line package switches, which may be arranged in pairs so as to provide two binary bits per variable (as described below in FIG. 15), or they may be independent selection switches to provide the desired binary values. At the start of the modification routine, the modification variables for position, PX, and for velocity, VX, are both initialized to zero in steps 7 and 8. The manner in which an operator can tailor the door profile is by adjusting the maximum velocity, the bench or final velocity, and the position at which V MAX will end (referred to as P DECL, herein); but any change in these factors causes commensurate changes in other factors. For instance, if only P DECL is changed, then that is the only factor which need be changed. But if V BENCH or V MAX are changed, a P DECL must be changed as a consequence of them, whether or not it is purposely changed by the operator. The one thing that must remain constant is the approximate maximum open or closed door position. The velocity profile should always reach bench velocity just before the doors are fully open or fully closed. The modification subroutine in FIG. 15 takes that into account by modifying the deceleration position with PX as a function of maximum velocity and/or bench velocity. If the maximum velocity switch (or switch pair as the case may be) is set to other than 00, then one or the other of tests 9-11 will calculate a new value of V MAX in a corresponding one of the steps 12-14 and will select a modification to the deceleration position (PX) in the corresponding one of steps 15-17. Similarly, if the bench velocity switch (or switch pair) is set to other than 00, one of the tests 18-20 will select a corresponding V END modification increment (VX) from a corresponding one of steps 21-23, and will add to the deceleration position modifier (PX) an additional modification in a corresponding one of steps 24-26. Similarly, if the switch (or switch pair) associated with the deceleration position is set to other than 00, one of the tests 27-29 will cause adding an additional factor to the position modifier (PX) in a corresponding one of the steps 30-32, for controlled modification of P DECL.

In the profile modification subroutine of FIG. 15, the point where maximum acceleration is to end (V MID) and the point where maximum deceleration is to end (V END) are both calculated as a function of the velocity which it is desired to reach. Since V MID is some value less than V MAX, and will be reached with accelerations which vary from maximum to minimum (as is obvious from FIG. 4), the difference between V MAX and V MID is the area under the acceleration curve as it changes from A MAX to zero. This area is obviously one half of A MAX times the time it takes for the acceleration to decrease from A MAX to zero. But this time is defined by −A SLOPE, which is by definition A MAX divided by that time increment. Therefore, V MID is equal to V MAX minus one half of A MAX over the time; but the time is A MAX over −A SLOPE. This yields one half A MAX squared over −A SLOPE. Since −A SLOPE is itself a negative number when V MAX is positive and a positive number when V MAX is negative the signs work out for opening and closing. Similarly, V END is calculated from the desired bench (final) velocity in the same fashion. When the door is opening as determined in test 35, the deceleration position is modified by subtracting the modification (PX) therefrom in step 36, but when the door is closing as determined by test 35, the position modification factor PX is added to P DECL in step 37. Similarly, V END is modified by subtracting VX therefrom in step 38 when the door is opening but is added thereto in step 39 when the door is closing.

Considering the variations of FIG. 15 one at a time, in conjunction with FIG. DX, if a higher maximum velocity is desired, as determined in test 9, this velocity is achieved by multiplying V MAX by some number which is preestablished in the subroutine. Obviously, this could also be achieved by simply adding V MAX to some predesigned value, or by multiplying it by some variable which also could be set. In any event, step 12 causes V MAX to be increased by 10%. As a consequence of this, the distance which the door must travel is accomplished partly at a higher velocity, and therefore deceleration from this higher velocity must occur at a greater distance from the fully closed or opened position (depending on whether the door is opening or closing). Therefore the factor PX must be subtracted in step 36 from P DECL, to start deceleration sooner. And similarly, if V MAX is reduced, the point at which deceleration is to begin may be increased (thereby requiring negative numbers for PX2 and PX3 in steps 16 and 17).

To adjust the bench velocity, all that is required is to adjust V END so that the final reduction of deceleration can be started sooner or later in the profile. However, this will also vary the position which the door will be at when the bench velocity is reached. Therefore, the entire deceleration portion of the profile can be moved relative to position by adjusting PX as well. This can cause the bench velocity to be reached at a desired position even though the velocity may be different. And, the positioning of the deceleration portion of the profile can be separately adjusted by means of the adjustment to P DECL, the position where the deceleration portion begins. This means that even the positional tailoring that may accompany V MAX or V BENCH variations can itself be tailored as well, to accommodate variations in door size, after the initial factors are set into the cab controller ROM.

The profile modifications subroutine of FIG. 15 may be utilized in any given elevator where door behavior differs from that which is empirically determined for elevator cabs of the type involved. This modification may be used, temporarily, pending determination of sluggishness or other characteristics of the door which may require extensive maintenance or new parts.

Completion of the profile modification subroutine of FIG. 15, including the generation of V MID and V END, whether or not any modifications are performed (none will be if all switches are set to 00), causes the time-controlled profile selection subroutine FIG. 14 to be resumed, by return through an exit point 40 on FIG. 15 to either test 14 or test 25 in FIG. 14.

Figure 13:
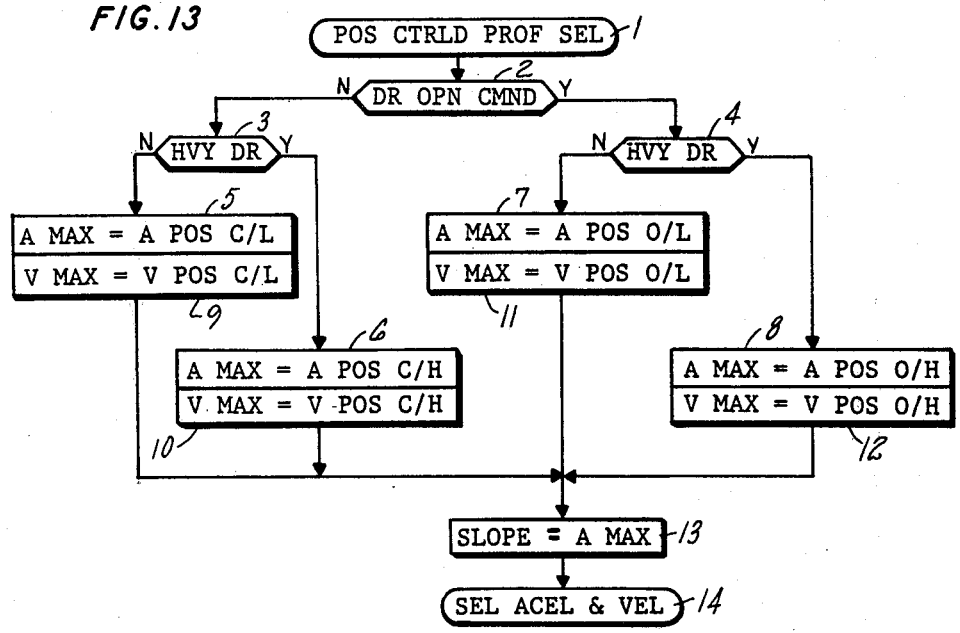
FIG. 13 is a logic flowchart of a position-controlled profile select subroutine.
Figure 16:
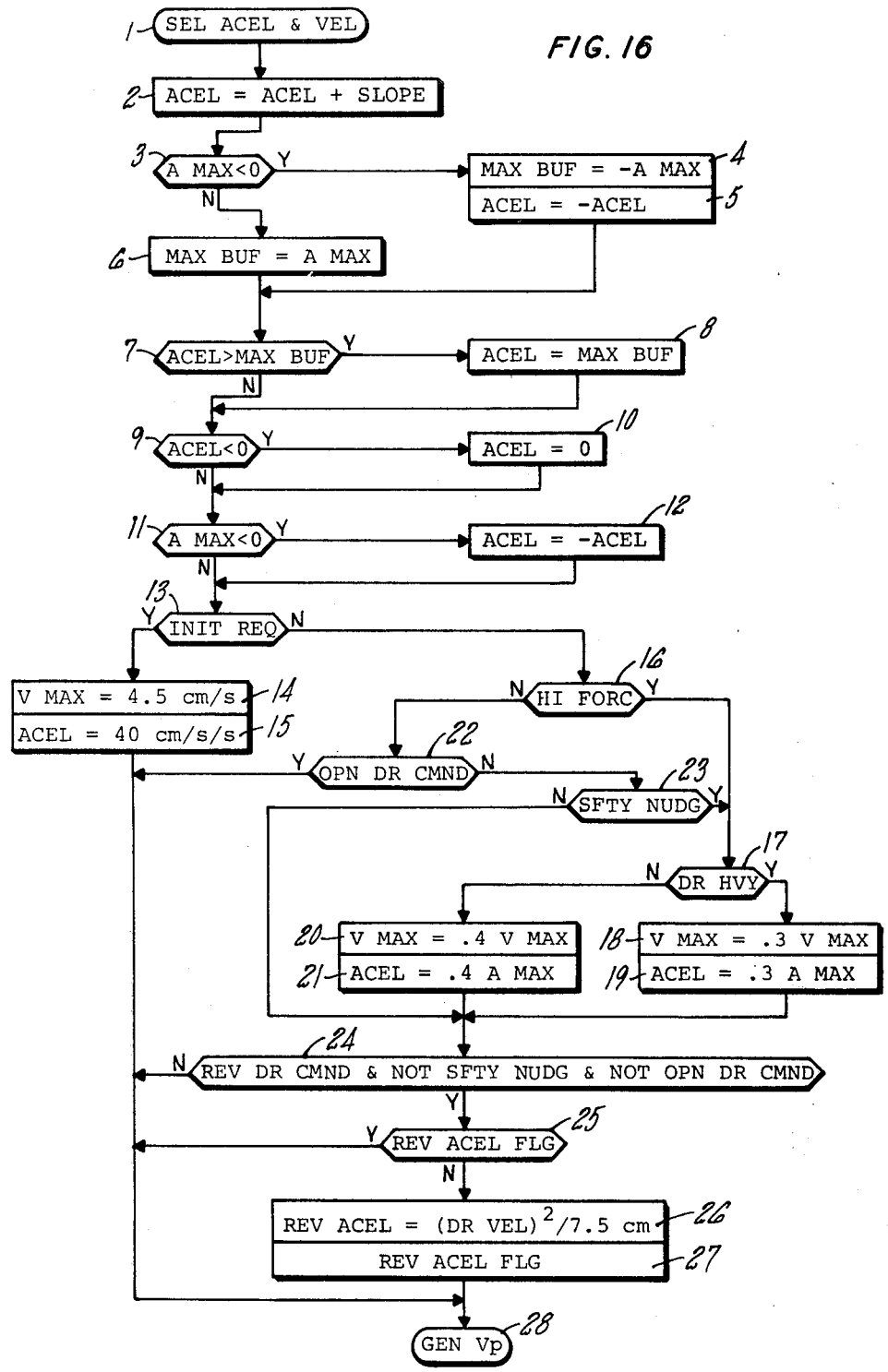
FIG. 16 is a logic flowchart of a select acceleration and velocity subroutine.

When either the position-controlled profile selection subroutine of FIG. 13, or the time-controlled profile selection of FIG. 14 is complete, the door control program continues through the select acceleration and velocity subroutine of FIG. 16 through entry point 1 therein. The acceleration in the case of the time-controlled velocity profile (illustrated in FIG. 4) starts out at zero with the doors fully open or fully closed, and is built up, incrementally, in each cycle by the +A SLOPE (set in FIG. 14), until it reaches A MAX, where it is clamped, and thereafter is decremented with a −A SLOPE, etc. After A MAX is reached, the incrementing still continues, but the acceleration is limited to A MAX. In a case of a position-controlled velocity profile, the slope is set equal to A MAX (FIG. 13), so the acceleration becomes A MAX during the first cycle. Thereafter, A MAX is continuously added to itself, but the actual acceleration is limited to A MAX, as is described hereinafter with respect to FIG. 16. Specifically, the incremental addition to acceleration (stepwise integration) is performed in step 2, regardless of what value of acceleration is achieved and regardless of whether a time or position-controlled velocity profile is being generated. Then, in test 3, A MAX is tested to see if it is negative. If it is, this means that either deceleration is being performed during door opening, or acceleration is being performed in door closing. In such case, a step 4 sets a buffer value of A MAX which is equal to negative A MAX, and a step 5 reverses the sign of the actual acceleration that has been achieved. This provides a maximum acceleration factor and the acceleration itself in positive or absolute value format for some comparisons to be made. If step 3 is negative, the maximum buffer is set equal to A MAX without inversion to permit using it for limiting the acceleration to the maximum value. Specifically, a test 7 determines if the acceleration exceeds the maximum buffer, and if it does, it causes step 8 to limit the acceleration to that in the maximum buffer. And then, a test 9 determines if the acceleration is less than zero (in this sense it is an absolute magnitude, and does not matter if it is acceleration or deceleration in a door closing or a door opening profile, respectively). If the acceleration has decelerated below zero, it is limited to zero in step 10. And then, a test 11 determines whether A MAX is negative (a corollary to step 3) and if so, reverses the sign of the acceleration to resort to its original negative value in step 12. Taken altogether, test 3 through step 13 simply comprise testing the absolute value of acceleration against A MAX and zero and limiting the acceleration to values between zero and A MAX.

The subroutine of FIG. 16 then continues with a test 13 to determine if initiation has been requested. If it has, V MAX is set to about 4.5 centimeters per second in step 14, and the acceleration is set to about 40 centimeters per second per second in step 15. Since both of these are negative, this will attempt to close the door with a limited acceleration and velocity; and since the initiation automatically causes a position-controlled profile, this low acceleration and velocity will be reduced when it exceeds the position dictated velocity to the target (a low bench velocity), as described with respect to step 23 of FIG. 16 hereinafter, so that the door will approach fully closed in a controlled slow fashion. On the other hand, if initiation has not been requested, test 13 will be negative so that test 16 can determine whether or not the high force flag is set. If it is, then test 17 will cause the maximum velocity and the acceleration to be limited in steps 18 and 19 or in steps 20 and 21, in dependence upon whether a heavy door is involved or not, respectively. But if the high force flag is not set, test 16 will be negative and test 22 will determine the door direction. If the door is closing, test 22 is negative so that test 23 can determine whether or not a safety nudge is ordered; if it is, then the acceleration and velocity are limited by steps 18–21 as described hereinbefore. If safety nudge has not been ordered, then a test 24 will determine if door reversal is permitted and required. If it is, then a reverse acceleration flag is tested in test 25. The flag is set only when test 25 fails so that this is a one-pass-only type of flag. The first time through test 25, it must fail so that a reverse acceleration value is calculated as the square of door velocity divided by 7.5 centimeters, which is twice the desired stopping distance during a door reversal, as described more fully and claimed in a commonly owned copending U.S. patent application filed on even date herewith by Schoenmann and Deric, Ser. No. 107,692. This relationship may be understood from the fact that velocity equals acceleration times time, and the stopping distance equals one half the acceleration times the square of time. So twice the desired stopping distance is acceleration times the square of time; but the time is equal to the velocity divided by the acceleration and this yields a net result that the acceleration equals the square of the velocity over twice the desired distance. This is set only one time because door velocity will of course change but the acceleration required for the stopping distance should remain the same in the several cycles it may take in order to stop the door during a door reversal. Therefore, step 27 sets the reverse acceleration flag so that the reverse acceleration value will not be altered. The reverse acceleration flag remains set until it is reset upon the completion of door reverse stopping, and the commencement of the opening phase of the door reversal, as is described hereinbefore with respect to the door direction subroutine in FIG. 9.

The factors of steps 14, 15, 18–21, and 26 may vary from one installation to another. The select acceleration and velocity subroutine of FIG. 16 is ended by reaching a transfer point 28 which causes the door control program to continue with the generation of the position controlled velocity by means of the generate Vp subroutine, which is entered in FIG. 17 through an entry point 1.

Figure 17:
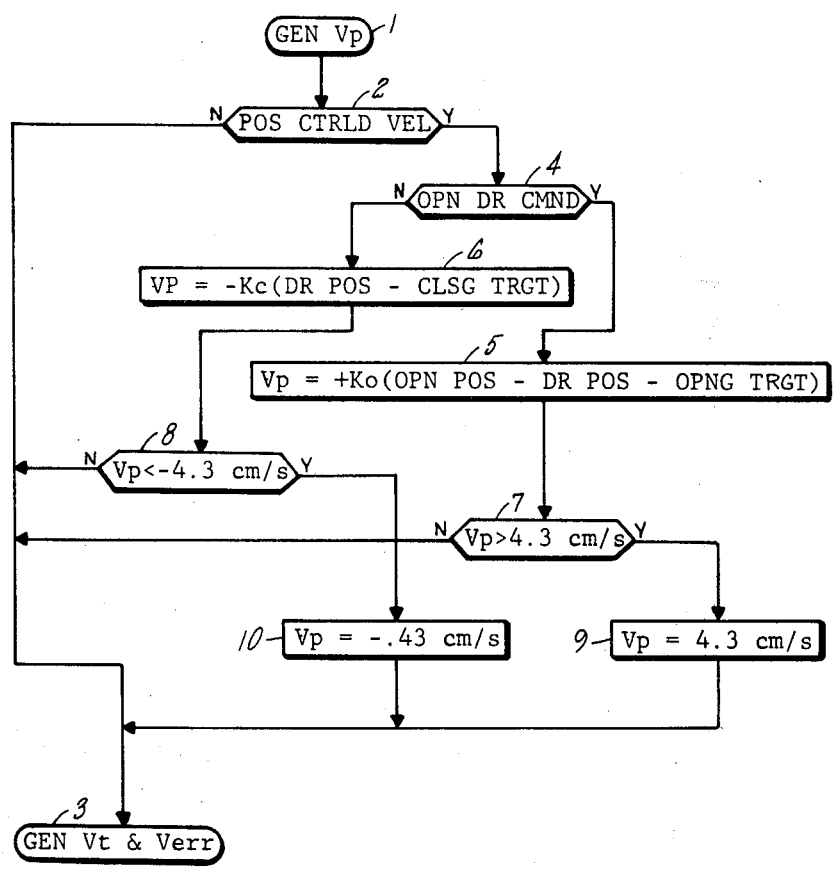
FIG. 17 is a logic flowchart of a generate position-controlled velocity (Vp) subroutine.

If a position-controlled velocity profile has not been ordered, as indicated in a test 2, of FIG. 17 then this subroutine is exited through a transfer point 3. But if position-controlled velocity has been ordered, then a test 4 determines the door direction and generates the position-controlled velocity profile (more specifically, the deceleration portion of the velocity curve, as illustrated in FIG. 5) as a constant times the remaining distance. When the door is opening, the remaining distance is the full open position minus the door position minus the target (which is an increment of distance from full open to the desired point of intersection with bench velocity). The same is true when a door is closing, except the fully closed position is zero and therefore can be eliminated from the calculation. Thus, velocity as a constant function of the remaining distance to be traveled is calculated in either steps 5 or 6 depending on whether the door is opening or closing, respectively. As an alternative, velocity (Vp) may be dictated as the square root or some other function of remaining distance. When the door is closing, a negative velocity is dictated and when the door is opening, a positive velocity is dictated. Then, in tests 7 and 8 the velocity is tested to see if it is more positive (if opening) or more negative (if closing) then some final bench velocity, and if so, the velocity is appropriately limited in steps 9 or 10, respectively. In a general case, the "target" identifies a position where the bench velocity will provide a smooth transition from the dictated velocity (nearly fully opened or closed).

Figure 18:
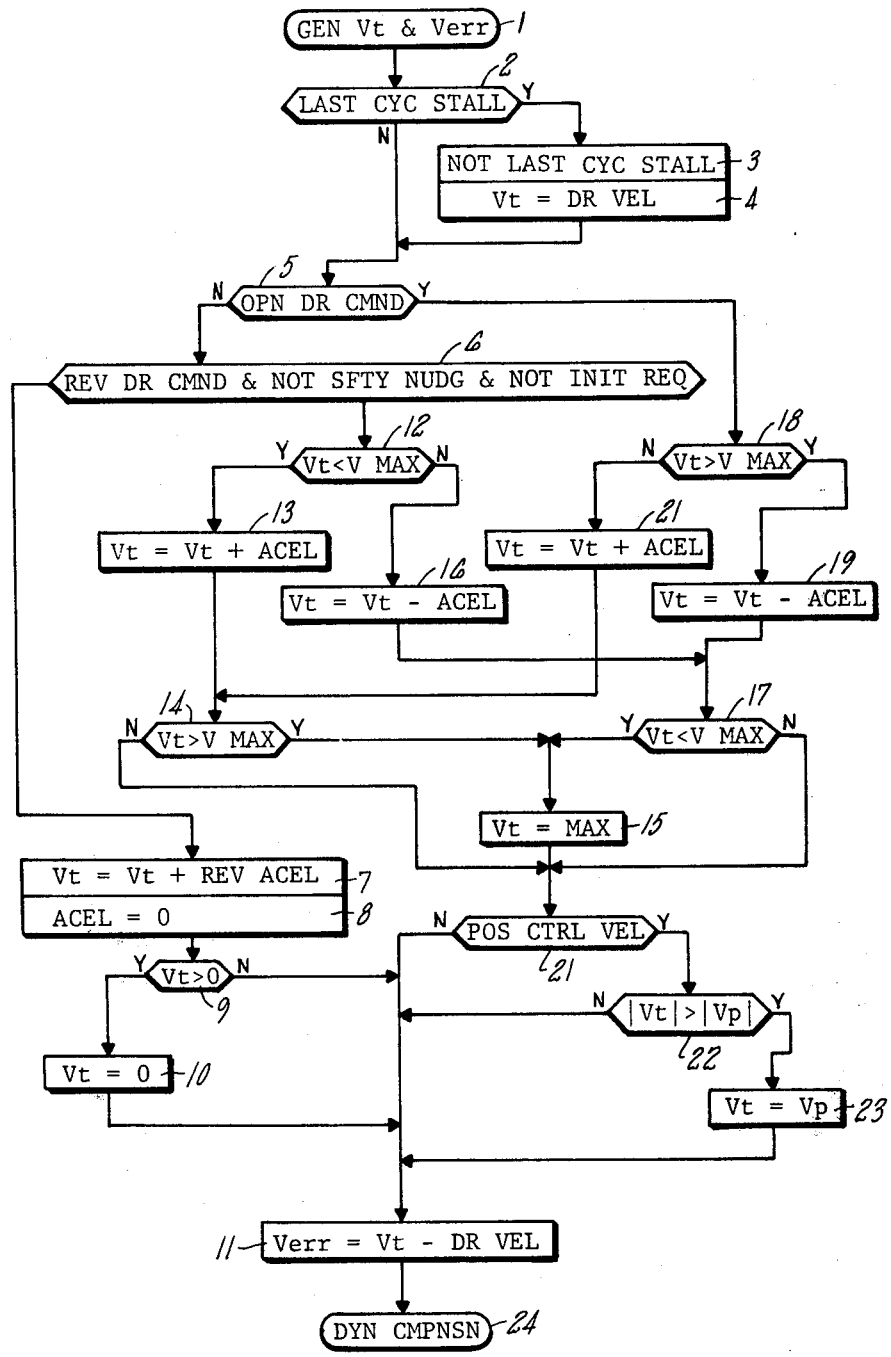
FIG. 18 is a logic flowchart of a generate time-controlled velocity (Vt) and error velocity (Verr) subroutine.

Whether or not a position controlled velocity is dictated, the door control program leaves the generate Vp subroutine of FIG. 17 through transfer point 3 and enters a generate Vt & Verr subroutine of FIG. 18 through entry point 1 therein. On the first pass of a velocity profile (that is, other than stall), test 2 determines if the last cycle was stall and if so, resets the last cycle stall flag in step 3 and also causes the time-controlled velocity, Vt, to be equal to the present door velocity in step 4. The reason for this is that if the last cycle was stall, the velocity profile is reached only by achieving a minimum door velocity with a stall current, as described with respect to FIGS. 11 and 12 hereinbefore, or an obstruction could be overcome, allowing the door to move freely, thus exceeding the stall velocity. This is taken into account so as not to have any step function increment in the door velocity as a function of calculating a velocity profile following a stall. Then, a test 5 determines if the door is opening, and if not, a test 6 determines if a permissible reverse door command is outstanding. If it is, then the time-controlled velocity has the reverse acceleration added to it (in piecewise integration) in step 7 and the acceleration integration process is reset in step 8 so as to be available in a reset state the next time that a normal door profile is to be generated. And then, test 9 determines when the door reversal is complete (a positive, opening velocity) and clamps the velocity at zero in step 10. Following that, Verr is calculated as the dictated velocity Vt minus the actual door velocity in step 11.

In the subroutine of FIG. 18, if the door direction is closing but test 6 determines that no reversal is involved, then a test 12 determines if the closing velocity exceeds (is more negative than) V MAX, and if it is, the acceleration value is added to Vt for stepwise integration toward X MAX in step 13; this condition could occur when, as described with respect to the select acceleration and velocity subroutine of 16, a high force flag or safety nudge causes V MAX to be reduced to some fraction of normal. This process of causing the negative velocity to be rendered more positive (reduced) continues until a test 14 determines that the velocity is now more positive than V MAX, and it is thereafter clamped at V MAX in step 15. On the other hand, if test 12 determined that the velocity was less than V MAX when in the closing direction, then the velocity would be rendered more negative by one increment of the acceleration in a piecewise integration fashion in step 16, until such time as a test 17 determined that the velocity was more negative than V MAX (in the closing direction) at which time step 15 would clamp the velocity at V MAX.

In a similar fashion, if test 5 in FIG. 16 determines that the door is opening, then a test 18 determines if the velocity is greater than V MAX, and if it is, the velocity is reduced in step 19 (which may be necessary whenever high force or safety nudge reduces the maximum velocity in this cycle) so as to cause the dictated velocity to reduce itself to that commanded by stall or nudging. This would continue until the velocity is so reduced as determined in test 17, after which it would be clamped at V MAX by step 15.

But if step 18 in FIG. 16 determines that the velocity is not in excess of V MAX, then it may be incremented cycle after cycle in step 20, in each pass through test 18, until test 14 determines that it has exceeded V MAX, in which case step 15 will cause it to be clamped at V MAX. If a test 21 determines that this is not a position-controlled velocity profile, then Verr is generated as described hereinbefore in step 11. But if this is a position-controlled velocity profile, the absolute magnitude of Vt is compared with that of Vp, and once it equals Vp, the Vp profile will take over from Vt due to Vt being set equal to Vp in step 23. In this connection, it should be noted that Vt, for a position-controlled velocity, is simply some maximum velocity which is established for a position-controlled profile until such time as deceleration for reaching V BENCH at an intended position is achieved, by crossing Vp, as is described hereinbefore with respect to FIG. 5.

Figure 19:
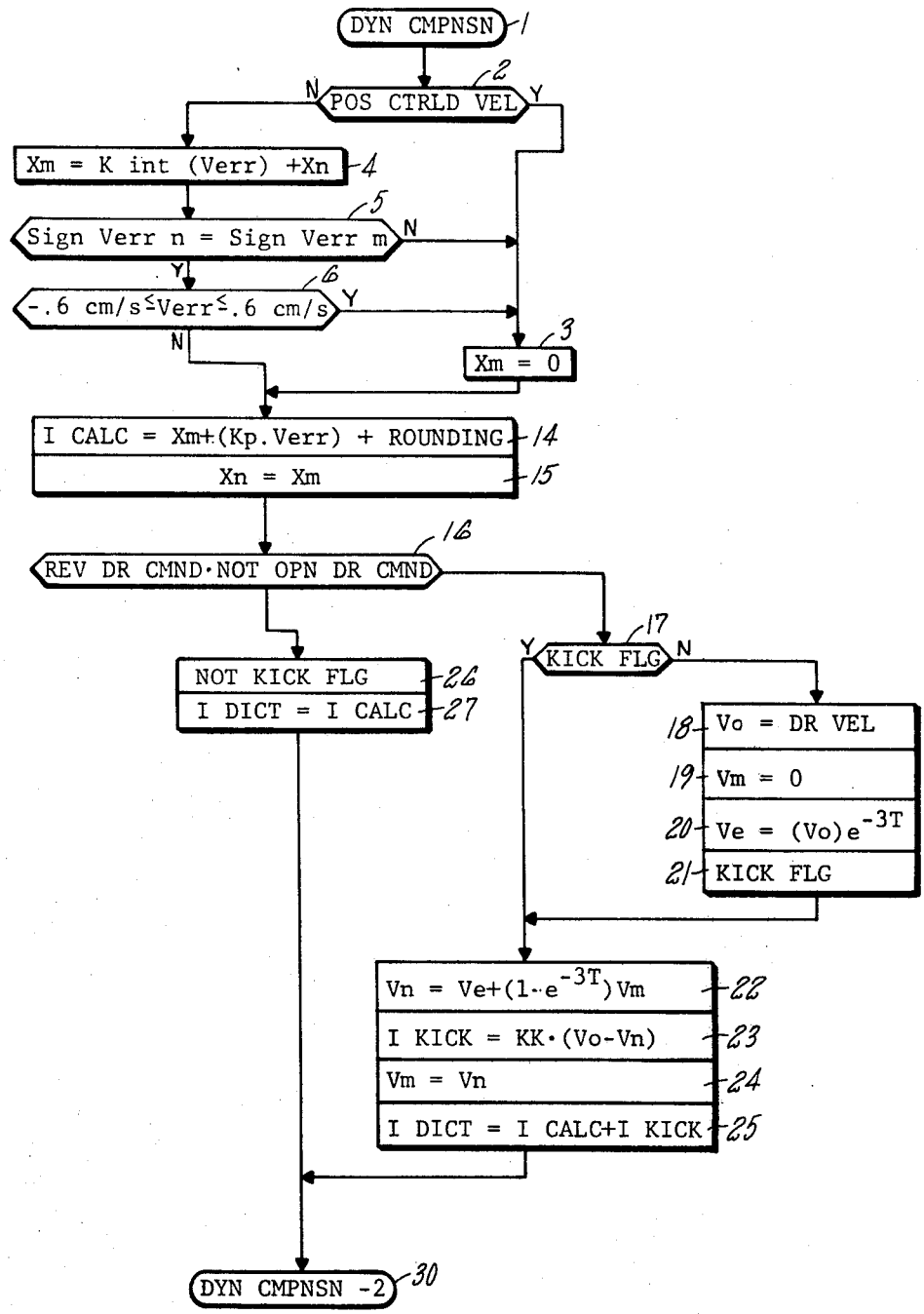

When Verr has been generated in step 11, the door control program operates through transfer point 24 so as to enter the dynamic compensation subroutine of FIGS. 19 and 20 through the entry point 1.

The dynamic compensation subroutine of FIG. 19 begins with a test 2 to determine whether integral gain should be provided to the velocity error which will be used to calculate the dictated door motor current. If a position-controlled velocity profile is being generated, the integral gain factor X is set to zero. But if a time-controlled velocity profile is involved, then a new value (Xm) of an integral gain factor, expressed as a magnitude of motor current, is generated in a step 4 as some integral gain constant (Kint) of the velocity error plus a previously calculated value for X (Xn). In order to be sure that the integral gain does not overshoot, which would provide a velocity error (not the basic velocity) with a sign opposite to the previous velocity error, a test 5 detects whether the sign of Verr has remained the same from the last cycle to the present cycle; if not, this means there is an overshoot and Verr is being overcompensated so that test 5 will be negative and the integral gain current factor (Xm) will be set to zero in step 3. If test 5 is affirmative, then a test 6 determines if the velocity error is within bounds of between minus and plus 0.6 centimeter per second. If it is not, the error is excessive and the integral gain is set to zero. But if Verr is very high, the dictated current will also be high, and will probably set the high force flag as described with respect to FIG. 20, below.

In FIG. 19, the next step 14 generates a calculated motor current (I CALC) as the summation of: the current generated with integral gain (Xm), plus a proportional gain constant (Kp) times the velocity error, plus some rounding that may be performed in a given embodiment of the invention, in dependence upon the particular processing system used and the conventions for the data which may be chosen. On the other hand, no rounding factor need be used; in cases where it is not demanded by the processor nor desired. In step 15, the value of Xm is saved as Zn for use in subsequent cycles in the integration process referred to hereinbefore.

In order to assist in stopping a closing door during a door reversal so that the door may thereafter be opened, a test 16 in FIG. 19 determines if there is a reverse door command and the open door command has not yet issued. If this is the case, the test is affirmative and a test 17 is made to see if this is the first pass through the subroutine since test 16 became affirmative. If it is the first pass, test 17 will be negative and cause steps 18–21 to be performed one time. Since step 21 will set the Kick flag, subsequent passage through test 17 will be affirmative and steps 18-21 will be bypassed. These steps provide an additional current component to the door motor, referred to herein as a reverse boost or Kick current, to assist in rapid stopping of the door when reversal has been commanded, as set forth in the aforementioned application of Schoenmann and Deric. The kick current is a filtered function of the door velocity at the time the reversal is commanded. The filter is a derivative lag filter, having the general frequency domain form of s/(s+t), where t is the time constant, here t=3. This may be expressed, for iterative digital approximation as follows.

I KICK=Kk(Vo-Vn)

where:
  I KICK=the reverse boost, or Kick, current
  Kk=the gain constant for Kick current
  Vo=the door velocity at the start of a door reversal
  Vn=a velocity component as a function of each pass of the program through the filter algorithm:
  $Vn = (Vo)e^{-3T} + (1-e^{-3T})Vm$ where:
  Vm=the value Vn of the preceeding cycle, and
  T=time duration of each cycle.

This value of current component is initially high and drops off to a small amount in about ⅓ second. It is sufficient to overcome backlash in reversing the door against its inertia, to aid the dictated acceleration (the square of the initial velocity, Vo, over twice the stopping distance, step 26, FIG. 16) in stopping the door within the distance required by the elevator code, such as about 5 cm. In this embodiment, stopping within 3.75 cm of the reverse command is effected.

In FIG. 19, if test 16 indicates door reversal, but not the point thereof where the door has stopped or slowed sufficiently to be commanded open, a test 17 checks a "once-only" Kick flag. If test 17 is negative, steps 18-20 initialize the filter routine, and step 21 sets the Kick flag so these steps will be bypassed in subsequent iterations (test 17 will then be affirmative). Then steps 22 and 23 generate a value of Kick current for successive VM's in each cycle, step 24 updates Vm, and the Kick current is added to dictated current in Step 25.

In FIG. 19, whenever door reversal is not being initiated, test 16 is negative, and step 26 resets the Kick flag. In each cycle other than during the initial phase of a door reversal, the dictated current is set equal to the calculated current by step 27.

The dynamic compensation subroutine of FIG. 19 passes through a transfer point 30 to reach the entry point 1 of the continuation of the dynamic compensation subroutine on FIG. 20.

In FIG. 20, test 2, if a door reversal is commanded and not prevented by nudge, when the door is closing, high currents can be expected, and the highforce portion of the subroutine is therefore bypassed by an affirmative result. Otherwise, in test 3, if there is a safety nudge, meaning that the operation control has determined that the door is probably blocked and should be nudged along, and if the door is closing (since an opening door need not be gently nudged), or if the high force flag is set, an affirmative result will lead to a step 4 which generates a limiting current equal to about 11.3 kilograms times the factor D which has been described hereinbefore, the limiting current being in the negative or closing direction. This is the same force as that of a closing stall force (step 13, FIG. 12), which is within the safety code limit. If the absolute value of dictated current exceeds some limiting value of current in test 5, then a test 6 determines the polarity and, dictated current is clamped to the limiting current in either step 7 or 8. The test accommodates current direction regardless of opening or closing direction, and even when overshoot in Verr causes current polarity to be opposite to door direction.

In FIG. 20, if test 3 is negative, meaning high force and nudging are not involved, then a test 9 determines whether the door velocity has reached maximum or not. If it has, there is no force required for acceleration and Verr should be small, so the door should be moved with relatively small currents compared to the currents required to achieve maximum velocity or to decelerate therefrom. Therefore, a test 10 determines if the absolute magnitude of the dictated current exceeds 2 amps. But if test 9 is negative, meaning that the door is accelerating or decelerating, then the absolute magnitude of dictated current is compared with 4 amps in a test 11. If excessive dictated current is determined in test 10 or test 11, then a test 12, comprising a high force timer, determines if this condition has existed for about 0.3 seconds. If it has not, it is assumed that this was caused by noise or some other transient condition, and no action is taken; but if it has, the high force flag is set in step 13, and the high force limited currents for 11.3 kgm, the same as a closing stall force, is generated and utilized as described with respect to steps 4-8, hereinbefore. Each time test 10 or 11 is negative, the high force timer (test 12) is reset in step 14. It is also reset whenever the high force current dictation is followed by stall (step 3, FIG. 12).

In FIG. 20, a step 15 adds the compensation current to the dictated current, and tests 16 and 17 determine if the dictated motor current is more than +4 amps or less than −4 amps, and steps 18 and 19 clamp the current to +4 amps or −4 amps, respectively, if necessary. Thus, the compensated current dictated to the motor cannot exceed 4 amps. In the normal case, where high force or nudge are not indicated, tests 2, 3, 10 or 11, are negative, so this routine only adds the compensation and tests for the 4 ampere (or other) limits, and outputs the dictated current by means of the subroutine 9a, FIG. 6, which is reached through a transfer point 20, FIG. 20. This completes the time or position-controlled velocity profile and current dictation to the door motor, so that the executive program is returned to, through a return point 16 (FIG. 6).

The present invention is particularly concerned with selection between a motion mode of operation (such as the velocity modes described herein) or a stall mode of operation, as is described hereinbefore with respect to FIG. 11, and in keeping track of when a previous cycle was in the stall mode as described hereinbefore with respect to FIG. 12. In the disclosed embodiment, both of the motion modes are velocity modes, one being controlled in accordance with desired rates of acceleration and deceleration and desired maximum velocity, acceleration and deceleration, and the other mode being controlled either by a maximum velocity or by the remaining distance which the door has to go to complete its traverse. But the invention may readily be employed in systems in which the motion mode is other than a closed-loop velocity dictation of the type described herein. For instance, if door motion were controlled by dictated position, the invention would still be a viable improvement therefor.

In the disclosed embodiment, as is evident from considerations of FIG. 11 hereinbefore, regardless of whether the door is commanded to open or commanded to close, if door velocity is in excess of the predetermined stall velocity, such as 1.3 centimeters per second as described herein, operation will be in the motion or velocity mode. On the other hand, if the door is moving at less than the stall velocity, then the operation may be in either the velocity mode or the stall mode, depending on other factors concerned with the present invention. For instance, when the velocity dips below the stall velocity, it may be an indication of noise, or backlash in the system including the transducer from which door velocity is derived. If in a subsequent cycle, the door velocity is indicated as being just over the stall velocity, a system could revert to the velocity mode. By providing the hysteresis time increment (test 9, FIG. 11) this situation is avoided. Thus, there is hysteresis in entering the stall mode. On the other hand, when the door is fully closed concurrently with door velocity being indicated as being less than stall velocity, the stall mode of operation will be invoked. But once it is invoked, the last cycle stall hysteresis provided by step 8 of FIG. 11 will prevent leaving the stall cycle until the door velocity is indicated one time as being greater than the stall velocity. And, once it is so indicated one time, operation resumes in the velocity mode and cannot reenter the stall mode again without passing the time test (test 9, FIG. 11). Thus hysteresis is provided in both entering and leaving the stall mode.

The invention, therefore, overcomes erratic operation due to contact bounce in the switches indicative of the door being fully open and closed, and erratic operation which could result from door velocity signals which vary, with a tolerance noise band, around the stall velocity.

All of the parameters, such as stall velocity, hysteresis time, and the like described herein with respect to the present invention, as well as the entire nature of the environment in which the present invention may be employed, are obviously adjustable to suit any implementation of the invention, and will normally vary from one installation to the next. Similarly, although the invention has been shown and described with respect to an exemplary embodiment thereof, it should be understood by those skilled in the art that the foregoing and various other changes, omissions and additions may be made therein and thereto, without departing from the spirit and the scope of the invention.

I claim:
1. Elevator door apparatus, comprising:
a motor driven elevator door mechanism;
demand means for providing signals indicative of demands to open or close said elevator door;
position means providing signals related to the position of said elevator door; and
control means for controlling said door mechanism in response to said demand signals and said position signals; characterized by:
said position means comprising a transducer for providing signals which vary as a function of the position of said door mechanism; and
said control means comprising cyclically operative signal processing means for providing, in response to said transducer, signal indications of the position and velocity of said door, and, in response to said demand means and said position and velocity signal indications, for controlling said door in either a motion mode of operation or a stall mode of operation, and, when operating in said motion mode of operation, for providing a dictated door motion control signal to effect desired motion of the door in response to said position and velocity signal indications and providing driving signals to said door mechanism in response to the difference between said signal indications and said door motion control signal, and, when operating in said stall mode of operation, providing driving signals to said door mechanism to provide a desired force on said door, for comparing said velocity signal indication with a signal indicative of a predetermined stall velocity, for operating in said motion mode of operation when the velocity of said door is greater than said predetermined stall velocity, and for operating in said stall mode of operation when said door velocity is less than said predetermined stall velocity for a predetermined hysteresis interval of time.

2. Elevator door apparatus according to claim 1 further characterized by said signal processing means comprising means for providing, in each cycle, an indication of whether operation was in said stall mode of operation or not in the immediately preceding cycle, and for operating, in any cycle, in said stall mode of operation whenever the velocity of the door is less than said stall velocity, and operation in the immediately preceding cycle was in said stall mode of operation.

3. Elevator door apparatus according to claim 1 further characterized by said position means comprising means for providing signals indicative of said door being fully open and fully closed, and said signal processing means comprises means for determining from the signals provided by said position means when said door is either fully open or fully closed and providing a corresponding pair of extreme position signals indicative thereof, and for operating in said stall mode when said door velocity is not greater than said predetermined stall velocity in the direction indicated by said demand means concurrently with the corresponding one of said extreme signals indicating that said door is at its extreme position in said direction.

* * * * *

UNITED STATES PATENT AND TRADEMARK OFFICE
CERTIFICATE OF CORRECTION

PATENT NO. : 4,300,661

DATED : November 17, 1981

INVENTOR(S) : Michael W. Hmelovsky

It is certified that error appears in the above-identified patent and that said Letters Patent is hereby corrected as shown below:

In the Abstract, line 10, "with" should read --when--

Column 2, line 8, "of" (2nd occurrence) should read --or--

Column 3, line 18, "cab" (first occurrence) should read --car--

Column 5, line 51, "the" (first occurrence) should read --with--

Column 6, line 7, "adquate" should read --adequate--

Column 8, line 67, "time base." should read --base.--

Column 9, line 63, "commerce" should read --commence--

Column 10, line 22, "principals" should read --principles--

Column 10, line 23, "respect door" should read --respect to door--

Column 12, line 27, "erros" should read --errors--

Column 12, line 60, "wihtin" should read --within--

Column 13, line 15, "realted" should read --related--

Column 15, line 22, "of" should read --or--

Column 18, line 52, "dicated" should read --dictated--

Column 21, line 15, "steps" should read --stops--

UNITED STATES PATENT AND TRADEMARK OFFICE
CERTIFICATE OF CORRECTION

PATENT NO. : 4,300,661

DATED : November 17, 1981

INVENTOR(S) : Michael W. Hmelovsky

It is certified that error appears in the above-identified patent and that said Letters Patent is hereby corrected as shown below:

Column 22, line 36, "as" should read --a--

Column 31, line 40, "X" should read --V--

Signed and Sealed this

Twelfth Day of July 1983

[SEAL]

*Attest:*

*Attesting Officer*

GERALD J. MOSSINGHOFF

*Commissioner of Patents and Trademarks*